US010299183B2

(12) United States Patent
Akiyoshi

(10) Patent No.: US 10,299,183 B2
(45) Date of Patent: May 21, 2019

(54) COMMUNICATION APPARATUS, COMMUNICATION METHOD, COMMUNICATION SYSTEM, AND PROGRAM

(71) Applicant: NEC Corporation, Tokyo (JP)

(72) Inventor: Ippei Akiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 63 days.

(21) Appl. No.: 15/313,490

(22) PCT Filed: May 22, 2015

(86) PCT No.: PCT/JP2015/002586
§ 371 (c)(1),
(2) Date: Nov. 22, 2016

(87) PCT Pub. No.: WO2015/178032
PCT Pub. Date: Nov. 26, 2015

(65) Prior Publication Data
US 2017/0188283 A1    Jun. 29, 2017

(30) Foreign Application Priority Data

May 23, 2014    (JP) ................................ 2014-106616

(51) Int. Cl.
*H04W 36/22* (2009.01)
*H04W 28/02* (2009.01)
*H04W 48/16* (2009.01)

(52) U.S. Cl.
CPC .......... *H04W 36/22* (2013.01); *H04W 28/02* (2013.01); *H04W 48/16* (2013.01)

(58) Field of Classification Search
CPC ...... H04W 36/22; H04W 48/16; H04W 28/02
See application file for complete search history.

(56) References Cited

U.S. PATENT DOCUMENTS 9,798,566 B2 * 10/2017 Beda, III ............ G06F 9/45558
2003/0053475 A1    3/2003 Veeraraghavan et al.
(Continued)

FOREIGN PATENT DOCUMENTS

CN    101573997 A    11/2009
CN    201699992 U    1/2011
(Continued)

OTHER PUBLICATIONS

Extended European Search Report issued by the European Patent Office for European Application No. 15796069.1 dated Jan. 23, 2018 (8 pages).
(Continued)

*Primary Examiner* — Andrew Lai
*Assistant Examiner* — Harry H Kim
(74) *Attorney, Agent, or Firm* — Wilmer Cutler Pickering Hale and Dorr LLP

(57) ABSTRACT

A new traffic offloading technique in a communication system is provided. A communication apparatus according to the present invention includes: a first means for selecting, from among a plurality of network nodes including a first network node and a second network node, the second network node for a terminal capable of autonomous communication with a communication-counterpart equipment, wherein the first network node performs predetermined signal processing in a first network and the second network node operates a function of the first network node through a virtual machine in a second network; and a second means for sending communication data related to the terminal to the second network node selected.

11 Claims, 30 Drawing Sheets

(56) References Cited

U.S. PATENT DOCUMENTS

| | | | |
|---|---|---|---|
| 2009/0323613 A1 | 12/2009 | Frederiksen et al. | |
| 2010/0232290 A1 | 9/2010 | Wong et al. | |
| 2011/0213871 A1 | 9/2011 | DiGirolamo et al. | |
| 2013/0238816 A1 | 9/2013 | Skog | |
| 2014/0123136 A1 | 5/2014 | Beda, III et al. | |
| 2014/0146673 A1* | 5/2014 | Parker | H04L 47/10 370/235 |
| 2017/0149586 A1* | 5/2017 | Takahashi | H04L 12/66 |

FOREIGN PATENT DOCUMENTS

| | | |
|---|---|---|
| CN | 102348214 A | 2/2012 |
| JP | 2009-118356 A | 5/2009 |
| JP | 2009-124367 A | 6/2009 |
| WO | WO-2008/036756 A2 | 3/2008 |
| WO | WO-2011147446 A1 | 12/2011 |

OTHER PUBLICATIONS

International Search Report and Written Opinion issued in corresponding International Patent Application No. PCT/JP2015/002586, dated Aug. 4, 2015, 7 pages.

China's Notification of First Office Action issued in corresponding Chinese Patent Application No. 201580026855.4, dated Dec. 27, 2018 (21 pages).

\* cited by examiner

FIG. 14

POLICY MANAGEMENT DB 24

| IDENTIFICATION RULE | DESTINATION |
|---|---|
| PORT NUMBER: 80 | LEGACY NETWORK |
| PORT NUMBER: 25 | VIRTUAL NETWORK |
| DST ADDRESS: TERMINAL PORT NUMBER: ANY | TERMINAL |
| ... | ... |

COMMUNICATION APPARATUS, COMMUNICATION METHOD, COMMUNICATION SYSTEM, AND PROGRAM

TECHNICAL FIELD

This application is a national stage application of International Application No. PCT/JP2015/002586 entitled, "Communication Apparatus, Communication Method, Communication System, and Program," filed on May 22, 2015, which claims the benefit of the priority of Japanese Patent Application No. 2014-106616, filed on May 23, 2014, the disclosures of each of which are incorporated herein in their entirety.

The present invention relates to a communication apparatus, a communication method, a communication system, and a program that are used for communication.

BACKGROUND ART

In recent years, with the proliferation of smartphones, smart devices, and the like, communication traffic is sharply increasing, so that network congestion easily occurs. Accordingly, several techniques are proposed for easing network congestion.

For example, PTL 1 discloses a technique in which a plurality of types of radio system are switched depending on the status of network congestion. A terminal, if it is capable of operating in both cellular communication and Wireless LAN (Local Area Network) as radio systems, can perform congestion determination and select an optimum radio system. For example, traffic on the cellular communication is switched to a wireless LAN network, whereby it is possible to ease congestion in the cellular network.

CITATION LIST

Patent Literature

[PTL 1]
Japanese Patent Application Unexamined Publication No. 2009-118356

SUMMARY

Technical Problem

However, the network switching technique disclosed in PTL 1 is limited to cases where a terminal is capable of using a plurality of different radio systems. Accordingly, if the terminal is unable to access the plurality of types of radio systems, for example, because of a location where the terminal is staying, communication traffic offloading cannot be performed, and consequently a reduction in network congestion cannot be achieved.

Accordingly an object of the present invention is to provide a new traffic offloading technique.

Solution to Problem

A communication apparatus of the present invention includes: a first means for selecting, from among a plurality of network nodes including a first network node and a second network node, the second network node for a terminal capable of autonomous communication with a communication-counterpart equipment, wherein the first network node performs predetermined signal processing in a first network and the second network node operates a function of the first network node through a virtual machine in a second network; and a second means for sending communication data related to the terminal to the second network node selected.

A communication method of the present invention includes: selecting, from among a plurality of network nodes including a first network node and a second network node, the second network node for a terminal capable of autonomous communication with a communication-counterpart equipment, wherein the first network node performs predetermined signal processing in a first network and the second network node operates a function of the first network node through a virtual machine in a second network; and sending communication data related to the terminal to the second network node selected.

A communication system of the present invention is a communication system including a communication apparatus that processes communication data related to a terminal, wherein the communication apparatus includes: a first means for selecting, from among a plurality of network nodes including a first network node and a second network node, the second network node for a terminal capable of autonomous communication with a communication-counterpart equipment, wherein the first network node performs predetermined signal processing in a first network and the second network node operates a function of the first network node through a virtual machine in a second network; and a second means for sending communication data related to the terminal to the second network node selected.

A program of the present invention causes a computer to execute: processing for selecting, from among a plurality of network nodes including a first network node and a second network node, the second network node for a terminal capable of autonomous communication with a communication-counterpart equipment, wherein the first network node performs predetermined signal processing in a first network and the second network node operates a function of the first network node through a virtual machine in a second network; and processing for sending communication data related to the terminal to the second network node selected.

Advantageous Effects of Invention

According to the present invention, it is possible to provide a new traffic offloading technique.

BRIEF DESCRIPTION OF DRAWINGS

FIG. 14 is a schematic diagram showing an example of the data structure of a policy management database provided to the base station according to the third exemplary embodiment.

DETAILED DESCRIPTION

Hereinafter, preferred embodiments of the present invention will be described. Each embodiment is shown for illustration, and the present invention is not limited to each embodiment.

1. First Exemplary Embodiment

Hereinafter, an example of an LTE communication system will be described as a communication system according to a first exemplary embodiment of the present invention. However, a communication system to which the present invention is applied is not limited to LTE. For example, the present invention can be also applied to GPRS (General Packet Radio Service), UMTS (Universal Mobile Telecommunication System), WiMAX (Worldwide Interoperability for Microwave Access), and the like.

1.1) System Architecture

Figure 1:
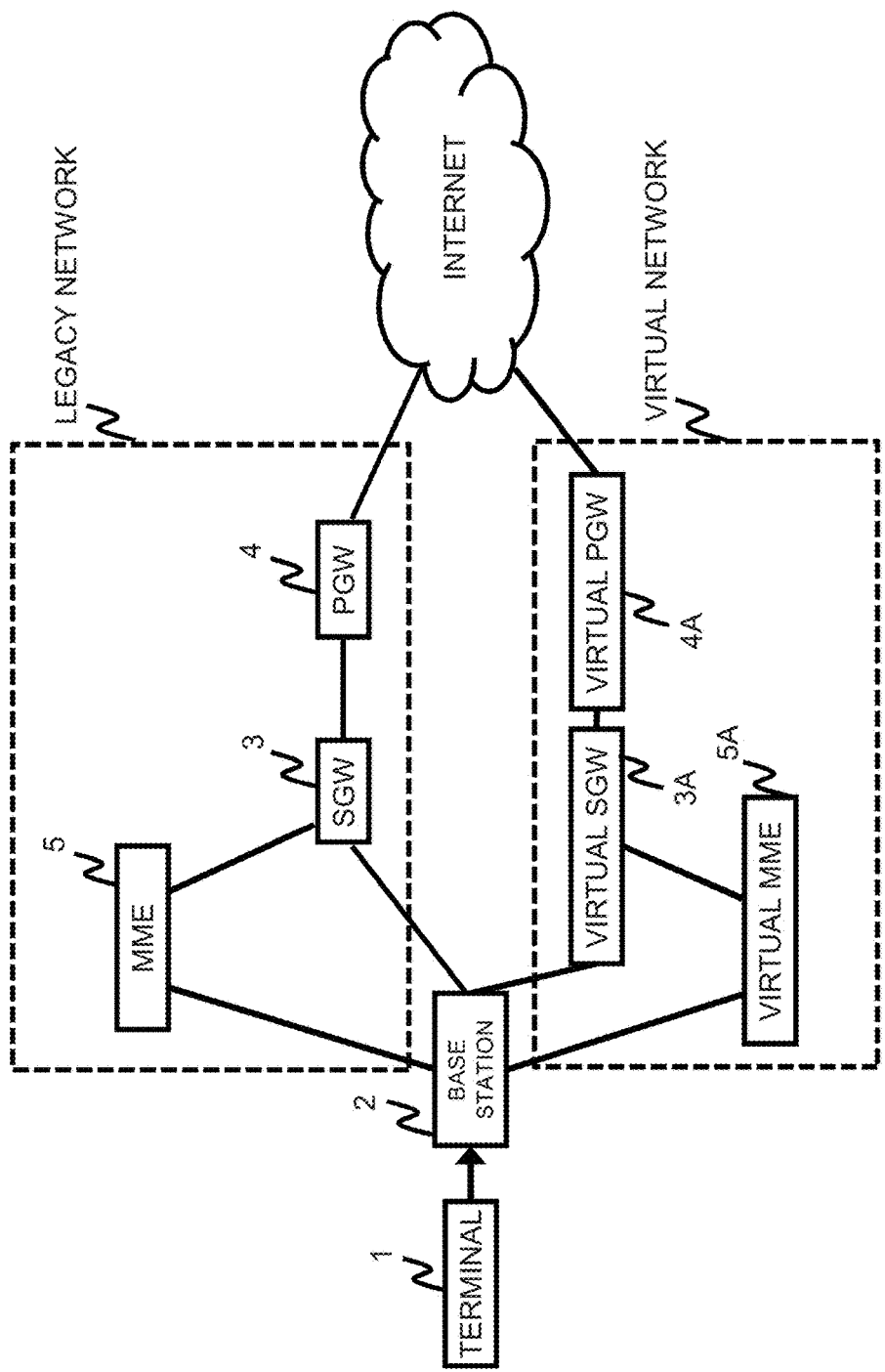
FIG. 1 is a system architecture diagram showing an example of a communication system according to a first exemplary embodiment of the present invention.

Referring to FIG. 1, it is assumed that the communication system according to the present exemplary embodiment includes a terminal 1, a legacy network, and a virtual network. The terminal 1 is a mobile telephone, PC (Personal Computer), mobile router, smart device (smart meter monitoring power consumption at home, smart television, or wearable terminal), M2M (Machine to Machine) device, or the like. M2M devices include, for example, industrial equipment, vehicles, healthcare equipment, home appliances, and the like in addition to the above-mentioned devices.

The legacy network and virtual network are backbone networks such as EPC (Evolved Packet Core) and are used for the terminal 1 to communicate with an external network such as the Internet via a base station 2.

The legacy network includes a plurality of network nodes for proving communication services to the terminal 1, and each network node is a communication apparatus having predetermined communication functions. For example, the network nodes are communication apparatuses such as the base station (eNB) 2, an SGW (Service Gateway) 3, a PGW (PDN Gateway) 4, and an MME (Mobility Management Entity) 5. For example, the terminal 1 can access a network such as the internet via the SGW 3 and PGW 4 by connecting to the base station 2.

Note that the communication system shown in FIG. 1 may include other networks than the legacy network and virtual network. Moreover, each of the legacy network and virtual network may include a plurality of types of networks such as, for example, an LTE network, a GPRS network, and a UMTS network.

Each network node illustrated in FIG. 1 performs predetermined signal processing. Each network includes, for example, the following functions related to signal processing.

SGW 3:
　Function of processing packets (User-Plane function)
　Function of processing control signaling (C-Plane function)
　Lawful interception (LI: Lawful Interception) function for intercepting communication PGW 4:
　Function of processing packets (User-Plane function)
　Function of managing charging status based on communication (PCEF: Policy and Charging Enforcement Function)
　Function of controlling policies such as QoS (PCRF: Policy and Charging Rule Function)

MME 5:
　Function of processing control signaling (C-Plane function)
　Function of managing subscriber information in the communication system in liaison with HSS (Home Subscriber Server)

In the virtual network, at least part of the functions of the network nodes in the legacy network are virtually run by software. For example, a function of a network node is run by an application on a virtual machine. For example, the virtual network is constructed in a datacenter including a server and other communication equipment (a router and the like). In the virtual network, the functions of some network nodes in the legacy network (e.g., the functions of an MME) can be run by software such as Virtual Machine.

The virtual network can be constructed by dynamically scaling out/scaling in a virtual machine. For example, the network operator can dynamically construct the virtual network by activating or deactivating a virtual machine depending on the status of communication traffic in the network, or depending on whether or not it is a predetermined time of day. Moreover, the network operator can also dynamically construct the virtual network by activating or deactivating a virtual machine to deal/dealing with a predetermined communication traffic, for example, the communication traffic of a predetermined terminal 1. Furthermore, the network operator can also dynamically construct the virtual network by activating or deactivating a virtual machine so that a requirement of communication traffic processing (e.g., SLA: Service Level Agreement) will be satisfied. For example, it is possible that some virtual machines are deactivated during predetermined hours when communication traffic is light, whereby resources allocated to the virtual network are suppressed, and power consumption in the datacenter is reduced.

The base station 2 can disperse, distribute, allocate, or switch communication traffic among the plurality of networks included in the backbone. In the example shown in FIG. 1, communication traffic is alloated to or switched between the legacy network and the virtual network included in the backbone of a radio network between the terminal 1 and the base station 2. Accordingly, for example, even if the terminal 1 that is operable in a network such as a wireless LAN is unable to access a wireless LAN, its communication traffic can be offloaded in the backbone network. Hence, according to the present exemplary embodiment, the base station 2 can perform traffic offloading independent of the radio environment of a terminal.

1.2) Communication Apparatus

Figure 2:
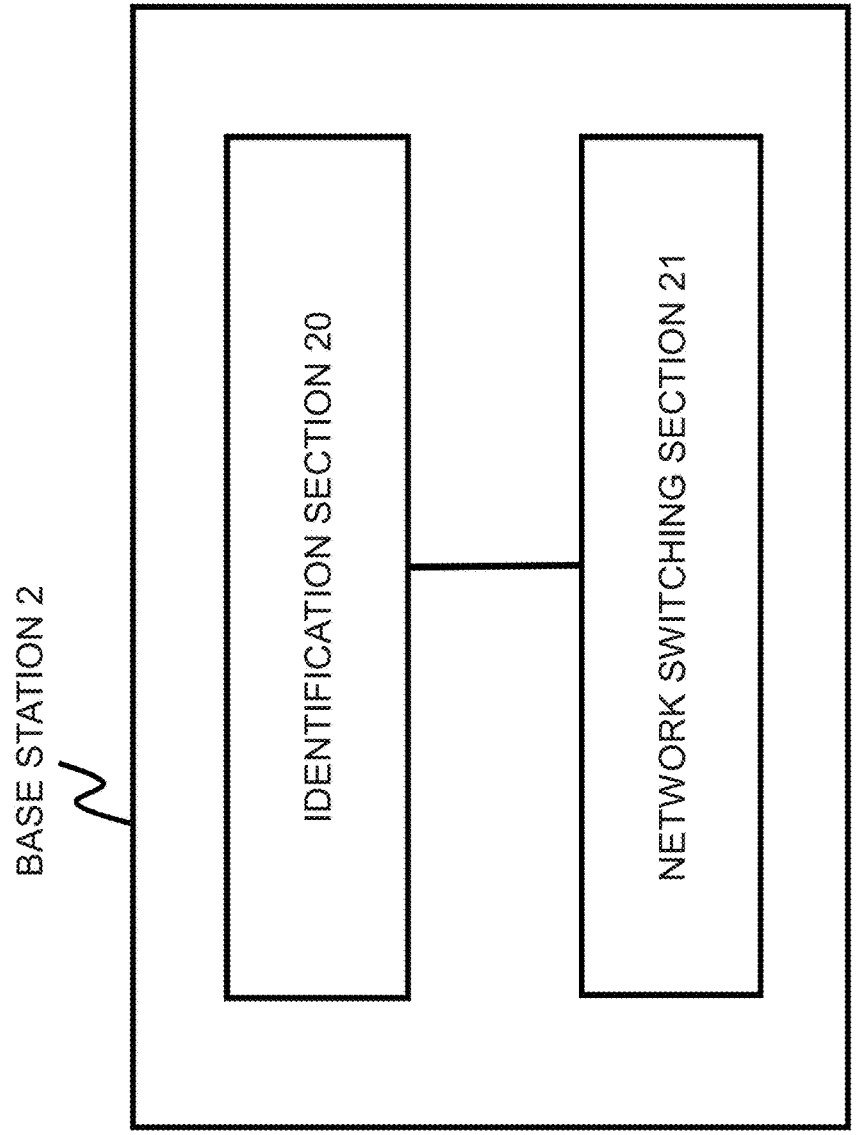
FIG. 2 is a block diagram showing an example of the schematic functional configuration of a base station according to the first exemplary embodiment.

FIG. 2 shows an example of the configuration of the base station 2, which is an example of the communication apparatus according to the present exemplary embodiment. The base station 2 includes an identification section 20 and a network switching section 21.

The identification section 20 identifies the type of a communication traffic or the attribute/type of the terminal 1 and selects a network corresponding to the identified communication traffic or the terminal 1 from among a plurality of networks including the legacy network and virtual network. Moreover, the identification section 20 may select a network node corresponding to the identified communication traffic or the terminal 1 from among a plurality of network nodes including the nodes of the legacy network and the virtual nodes of the virtual network.

As another example, the identification section 20 can identify the type of a communication traffic, the type of the terminal 1, or the like, based on a predetermined identification policy. For example, the identification section 20 identifies a communication traffic that should be processed in the virtual network, based on an identification policy. Moreover, for example, the identification section 20 identifies whether or not the terminal 1 is a terminal 1 of a type that should be processed in the virtual network, based on an identification policy. The identification policies of the identification section 20 can be dynamically changed, for example, by the network operator.

The network switching section 21 forwards a communication traffic to a network selected for this communication traffic. For example, the network switching section 21 switches a path for forwarding the communication traffic so that the communication traffic related to the terminal 1 will travel over the selected network (e.g., the legacy network or virtual network). For example, the network switching section 21 forwards a specific communication traffic identified by the identification section 20 to the virtual network.

The network switching section 21 can distinguish between and manage a network node of the legacy network and a virtual network nodes of the virtual network, as illustrated in FIG. 1. For example, the network switching section 21 distinguishes between and manages identification information related to the node of the legacy network (e.g., address of the node, or the like) and identification information related to the virtual node of the virtual network (e.g., address of the virtual node, or the like). Moreover, for example, the network switching section 21 may manage the identification information of each node in association with a flag that indicates whether or not this node is a virtual node. With the above-described configuration, the network switching section 21 can send a communication traffic that should be offloaded onto the virtual network to a virtual node on the virtual network.

The identification section 20 identifies, for example, whether or not the terminal 1 is an MTC (Machine Type Communication) device. For example, the network switching section 21 forwards a communication traffic of the terminal 1 identified as an MTC device by the identification section 20 to the virtual network. For example, when the terminal 1 is an MTC device, the identification section 20 may identify an MTC device group to which this terminal 1 belongs. The network switching section 21 switches a network to which the communication traffic related to the terminal is forwarded, for example, depending on the identified MTC device group.

The identification section 20 can identify a communication traffic corresponding to a predetermined application. As an example, when the identification section 20 identifies a communication traffic corresponding to an M2M (Machine-to-Machine)-related application, the network switching section 21 forwards this M2M-related communication traffic, for example, to the virtual network. As another example, the identification section 20 may identify a communication traffic corresponding to an SNS (Social Network Service) application or the like. Moreover, the identification section 20 may identify a communication traffic corresponding to an application operating in the background of the terminal 1 (e.g., an application automatically performing communication at predetermined time intervals, irrelevant to a user's manipulation).

The identification section 20 can identify a communication traffic corresponding to a predetermined location (e.g., a predetermined base station, a predetermined cell, or the like). As an example, the identification section 20 can identify a communication traffic corresponding to a location where many users gather (an event venue, a shopping mall, or the like). The network switching section 21 forwards the communication traffic identified by the identification section 20, for example, to the virtual network.

FIG. 2 illustrates the base station 2 as the communication apparatus according to the present exemplary embodiment. However, it is also possible that the MME 5 has the above-described functions of the identification section 20 and network switching section 21 as the communication apparatus.

<Terminal>

The base station 2 can also select a network, based on a predetermined message sent by the terminal 1. Hereinafter, an example of the configuration of the terminal 1 capable of sending the predetermined message to the base station 2 will be shown with reference to FIG. 3.

Figure 3:
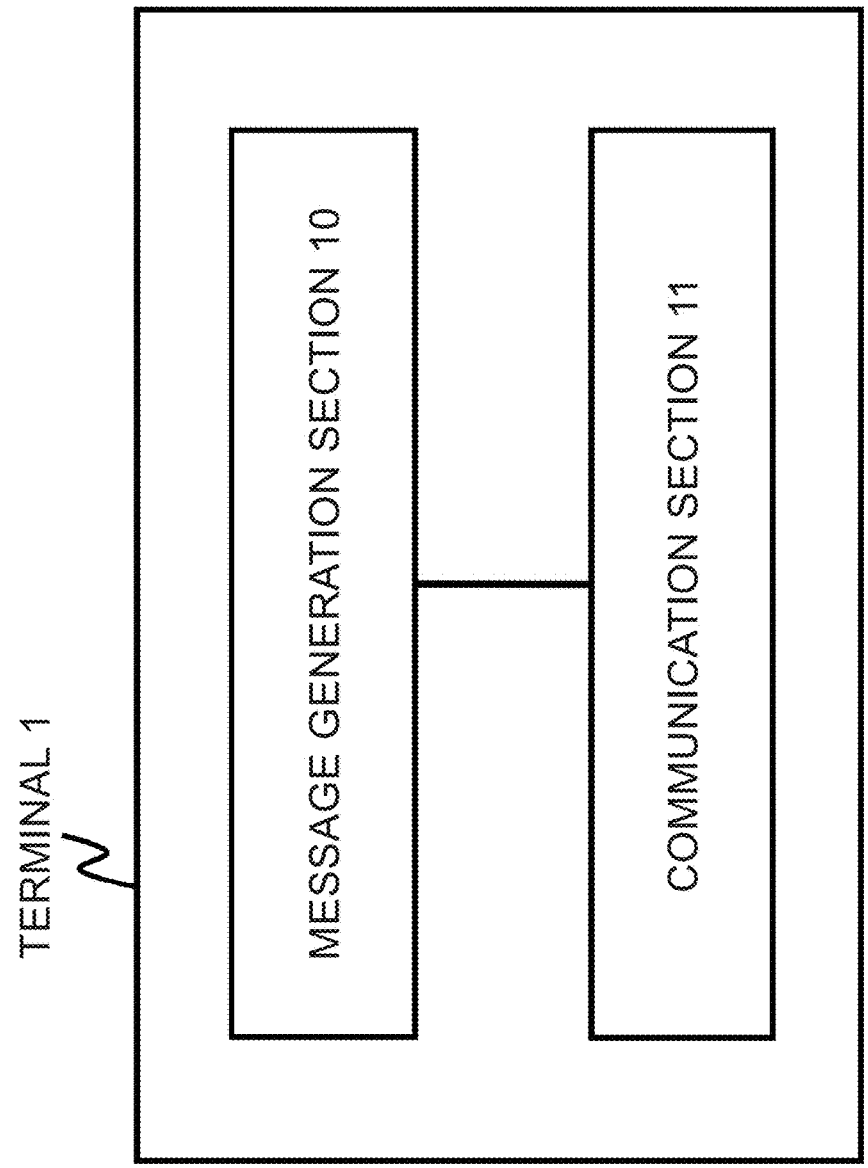
FIG. 3 is a block diagram showing an example of the schematic functional configuration of a terminal according to the first exemplary embodiment.

Referring to FIG. 3, the terminal 1 includes a message generation section 10 and a communication section 11.

The message generation section 10 generates a message for the base station 2 to select a network. For example, the message generation section 10 generates a message including information that indicates whether or not the terminal 1 is an MTC device. Moreover, for example, the message generation section 10 generates a message including information that indicates an application corresponding to a communication traffic.

The communication section 11 sends the generated message to the base station 2. The base station 2 selects a network based on the message sent from the terminal 1, as described above.

Traffic offloading according to the present exemplary embodiment can be performed by using either the base station 2 illustrated in FIG. 2 or the terminal 1 illustrated in FIG. 3, or both of them. Hereinafter, a communication method according to the present exemplary embodiment will be described.

1.3) Operation

Figure 4:
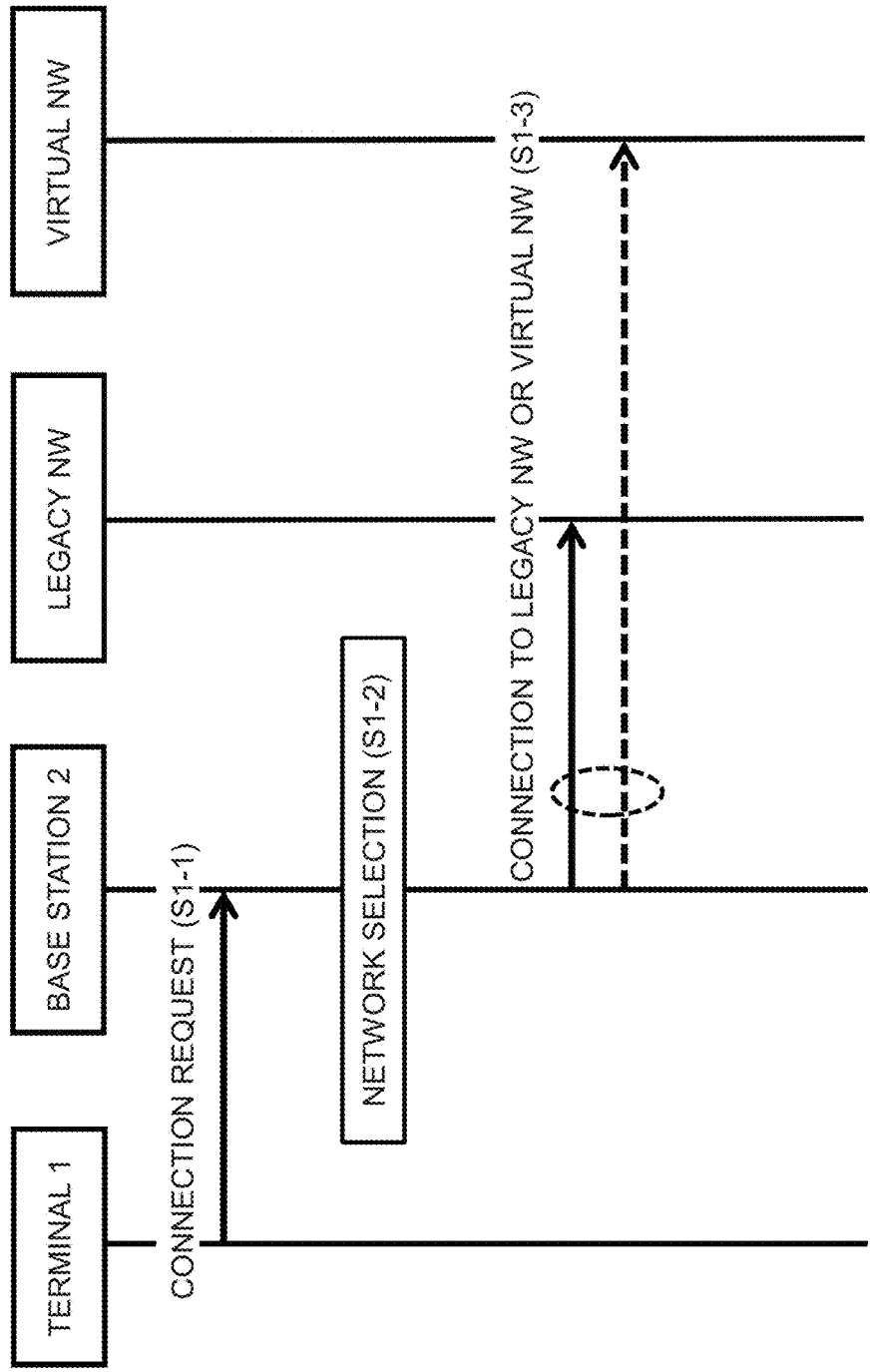
FIG. 4 is a sequence chart showing an example of operation in the communication system according to the first exemplary embodiment.

FIG. 4 is a sequence chart showing an example of operation in the communication system according to the first exemplary embodiment of the present invention.

The terminal 1 notifies a network connection request to the base station 2 (Operation S1-1). The terminal 1 notifies the network connection request to the base station 2, for example, when power is turned on, or when the cellular communication function is turned on, or the like.

In response to the connection request from the terminal 1, the base station 2 selects a network for the terminal 1 to connect to (Operation S1-2). In the system illustrated in FIG. 1, the base station 2 selects either the legacy network or the virtual network. As an example, if the terminal 1 having notified the connection request is an MTC device, the base station 2 connects this terminal 1 to the virtual network.

The base station 2 connects the terminal 1 to the selected network (Operation S1-3). In the system illustrated in FIG. 1, the base station 2 connects the terminal 1 to either the legacy network or the virtual network. The base station 2 can control the traffic volume flowing into the legacy network, for example, by connecting terminals 1 of a predetermined type or communication traffic of a predetermined type to the virtual network.

2. Second Exemplary Embodiment

According to a second exemplary embodiment of the present invention, a base station 2 can select a network node for a terminal 1 to connect to, depending on whether or not the terminal 1 is an MTC device. The technique of the second exemplary embodiment is applicable to any of the first exemplary embodiment and under-described embodiments. Note that MTC devices include the M2M devices recited as examples in the above-described exemplary embodiment.

MTC devices include, for example, smart devices (smart meters monitoring power consumption at home, smart televisions, wearable terminals, and the like), industrial equipment, vehicles, healthcare equipment, home appliances, and the like. MTC means a form of data communication that does not necessarily require human involvement, like, for example, a smart meter. That is, an MTC device is capable of autonomous communication with communication-counterpart equipment. Standardization of MTC is underway in technical standard specifications (3GPP TS22.368 and the like). Conceivable uses of an MTC device include a case where an MTC device performs communication at a specified time (e.g., "at 12:00 p.m. every day", "at 3:00 a.m. every Friday", or the like). Accordingly, in case where there are a number of MTC devices of the same type (e.g., smart meters), it is conceivable that if they start communication at the same time, a large volume of traffic may occur at a specified time. Such a large volume of traffic can be a heavy load on the legacy network.

According to the second exemplary embodiment of the present invention, even if a large volume of traffic as described above occur, the base station 2 can offload the communication traffic of MTC devices onto the virtual network and thus can reduce the communication traffic processing load on the legacy network. Since it is expected that an enormous number of MTC devices will be connected to a communication system in the future, for example, the base station 2 offloads control signals for connecting the MTC devices to a network onto the virtual network, whereby the control signal processing load on the legacy network can be greatly reduced.

2.1) System Architecture

Figure 5:
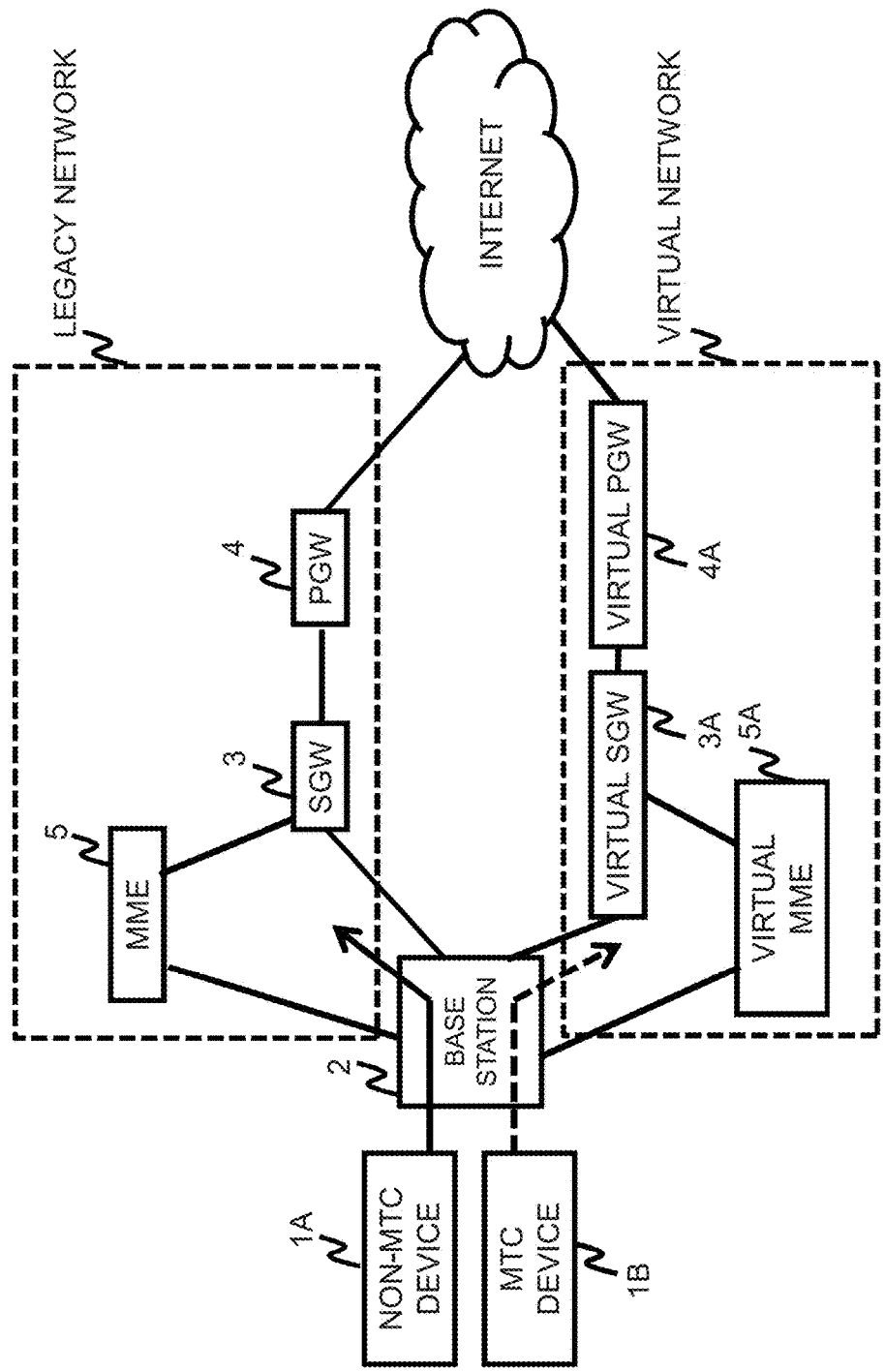
FIG. 5 is a system architecture diagram showing an example of a communication system according to a second exemplary embodiment of the present invention.

As illustrated in FIG. 5, a communication system according to the present exemplary embodiment has an architecture similar to that shown in FIG. 1. However, it is assumed that terminals 1 include a Non-MTC device 1A and an MTC device 1B. The configurations of the Non-MTC device 1A, MTC device 1B, and base station 2 are similar to those of the first exemplary embodiment, and therefore the same reference signs are given thereto and a detailed description thereof will be omitted. Moreover, the functions of network nodes (PGW 3, PGW 4, and MME 5) illustrated in FIG. 5 are also similar to those of the first exemplary embodiment, and therefore a detailed description thereof will be omitted.

The base station 2, which is a communication apparatus according to the present exemplary embodiment, can connect the MTC device 1B and non-MTC device 1A to a virtual network and a legacy network, respectively. Accordingly, the base station 2 can offload communication traffic related to the MTC device 1B onto the virtual network.

According to the second exemplary embodiment, for example, a virtual network node included in the virtual network is run by a virtual machine, which is dynamically constructed according to a requirement related to processing of the communication data of the MTC device 1B. The requirement is, for example, performance and a communication bandwidth required for processing of the communication data of the MTC device 1B, SLA (Service Level Agreement) required for the communication of the MTC device 1B, a time period of day when the communication of the MTC device 1B occurs, or the like.

2.2) Operation

<First Operation Example>

Figure 6:
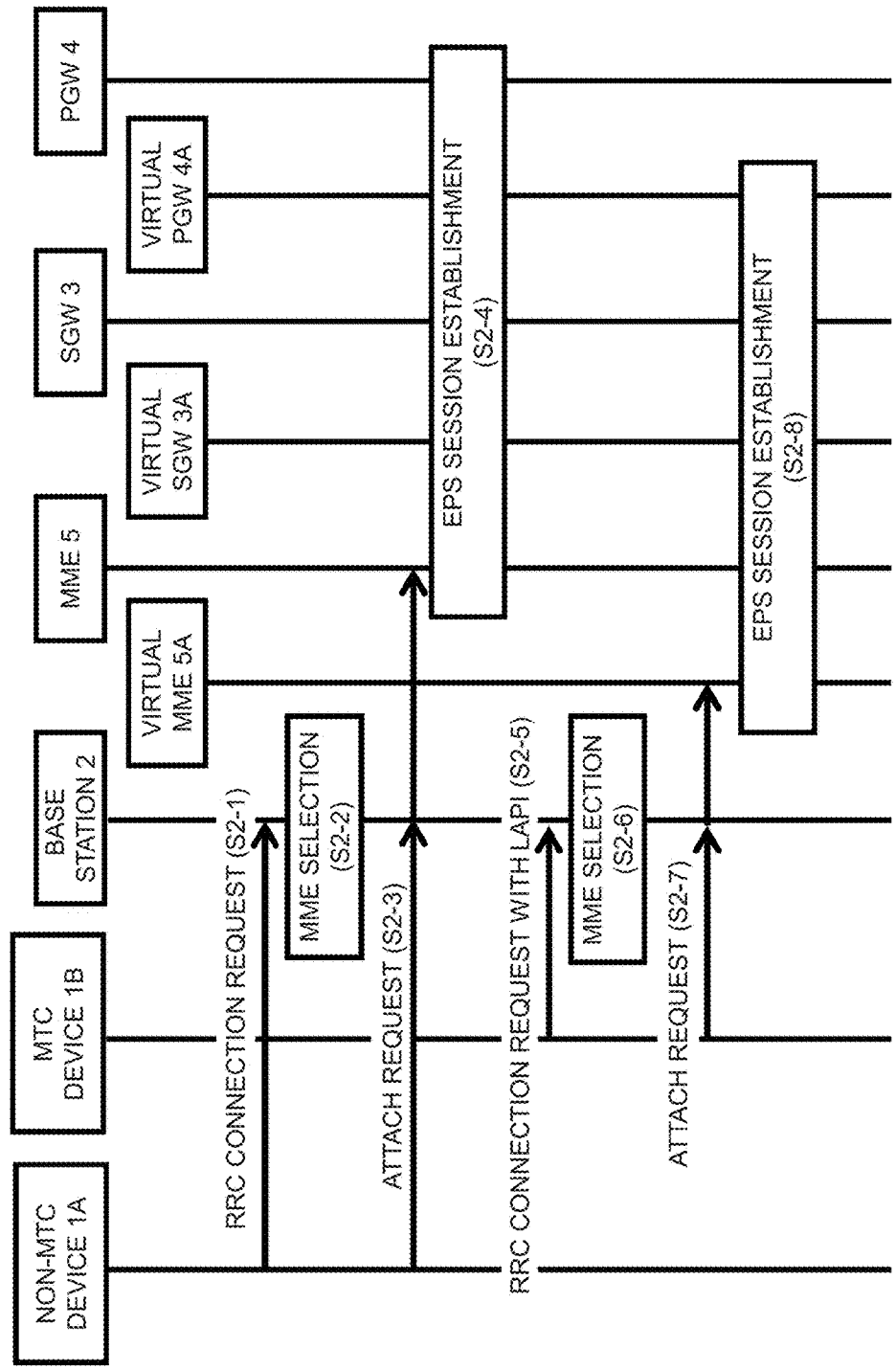
FIG. 6 is a sequence chart showing a first example of operation in the communication system according to the second exemplary embodiment.

A sequence illustrated in FIG. 6 shows a first example of operation in which a communication method according to the present exemplary embodiment is applied to the "Attach Procedure" described in subchapter 5.3.2 of 3GPP (3rd Generation Partnership Project) specifications (TS23.401 v12.3.0).

Referring to FIG. 6, it is assumed that the non-MTC device 1A sends "RRC Connection Request" to the base station 2 to establish a radio connection between itself and the base station 2 (Operation S2-1).

The base station 2, in response to reception of the "RRC Connection Request", selects an MME to which the terminal is to be connected (Operation S2-2). For example, the identification section 20 of the base station 2 identifies whether or not the terminal is an MTC device, based on information included in the "RRC Connection Request". As an example, the identification section 20 identifies whether or not the type of the terminal is MTC device, based on whether or not a "LAPI: Low Access Priority Indicator" is included in the "RRC Connection Request". Since no "LAPI" is included in the "RRC Connection Request" sent from the non-MTC device 1A, the terminal is identified as a non-MTC device in Operation S2-2, and the legacy network is selected for this non-MTC device.

The non-MTC device 1A sends a message for requesting connection to a network ("Attach Request") to the base station 2. Since the MME 5 in the legacy network has been selected in Operation S2-2, the network switching section 21 of the base station 2 sends the "Attach Request" received from the non-MTC device 1A to the MME 5 in the selected legacy network (Operation S2-3).

In response to reception of the "Attach Request", the MME 5 in the legacy network initiates an EPS bearer establishment procedure (Operation S2-4). Upon initiation of the EPS bearer establishment procedure by the MME 5, control signals are exchanged between the SGW 3, PGW 4, MME 5, and base station 2, and an EPS bearer is established. The network switching section 21 of the base station 2 sends and receives communication data related to the non-MTC device 1A via the EPS bearer, whereby the non-MTC device 1A can perform communication with an external network via the established EPS bearer.

On the other hand, when the MTC device 1B sends "RRC Connection Request" to the base station 2 (Operation S2-5), system operation as follows is performed.

The base station 2, in response to reception of the "RRC Connection Request", selects an MME to which the terminal is to be connected (Operation S2-6). Since the "RRC Connection Request" sent from the MTC device 1B includes a "LAPI", the identification section 20 of the base station 2 identifies the terminal having sent the "RRC Connection Request" as an MTC device, based on the LAPI included in the "RRC Connection Request", and selects the virtual network for this MTC device.

Accordingly, when the MTC device 1B sends a message for requesting connection to a network ("Attach Request") to the base station 2, the network switching section 21 of the base station 2 sends the "Attach Request" received from the MTC device 1B to the virtual MME 5A in the selected virtual network (Operation S2-7).

In response to reception of the "Attach Request", the virtual MME 5A initiates an EPS bearer establishment procedure (Operation S2-8). Upon initiation of the EPS bearer establishment procedure by the virtual MME 5A, control signals are exchanged between the virtual SGW 3A, virtual PGW 4A, virtual MME 5A, and base station 2, and an EPS bearer is established. The network switching section 21 of the base station 2 sends and receives communication data related to the MTC device 1B via the EPS bearer, whereby the MTC device 1B performs communication via the established EPS bearer.

<Second Operation Example>

Figure 8:
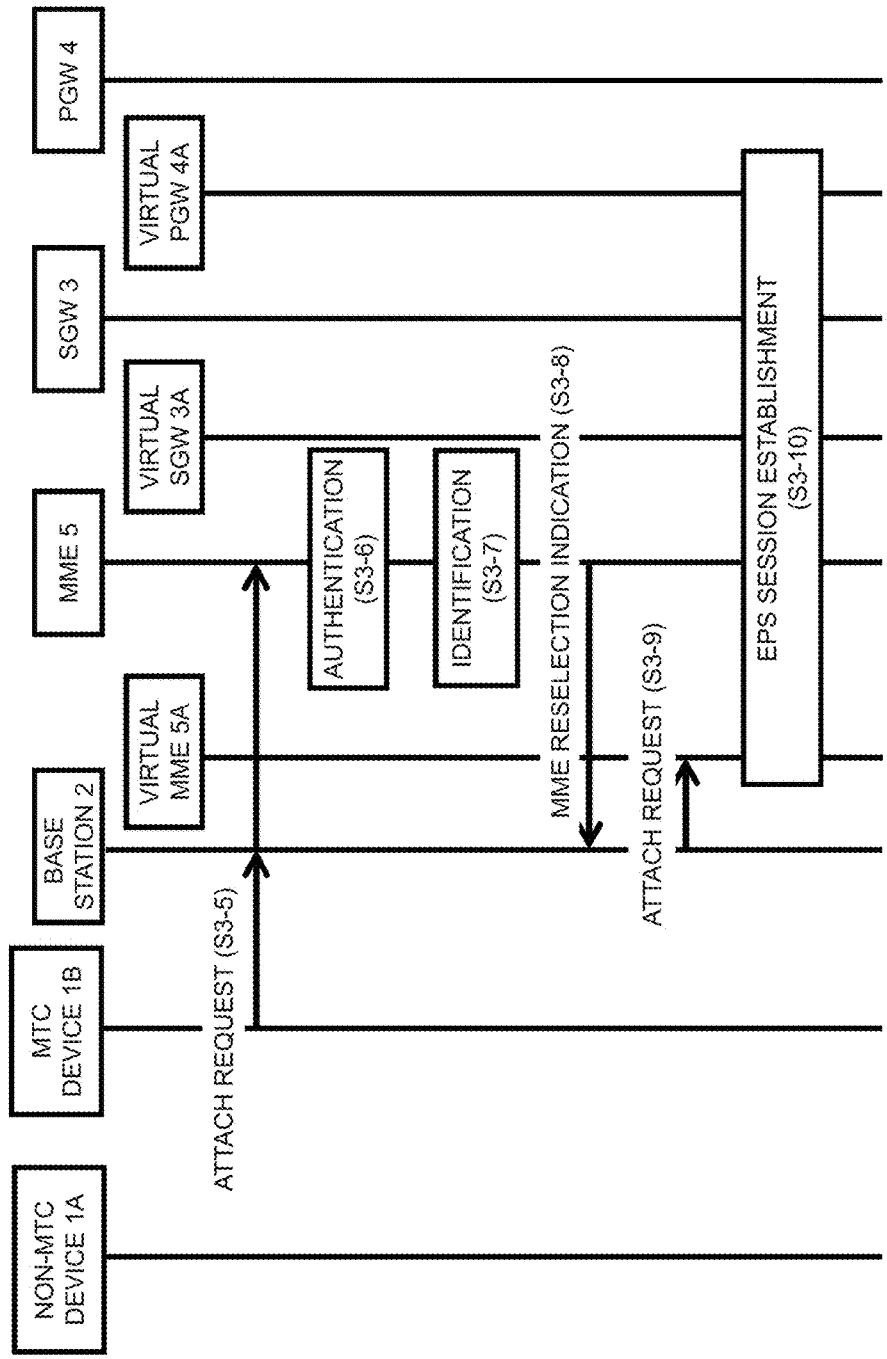
FIG. 8 is a sequence chart showing operation related to an MTC device in the second example of operation in the communication system according to the second exemplary embodiment.
Figure 9:
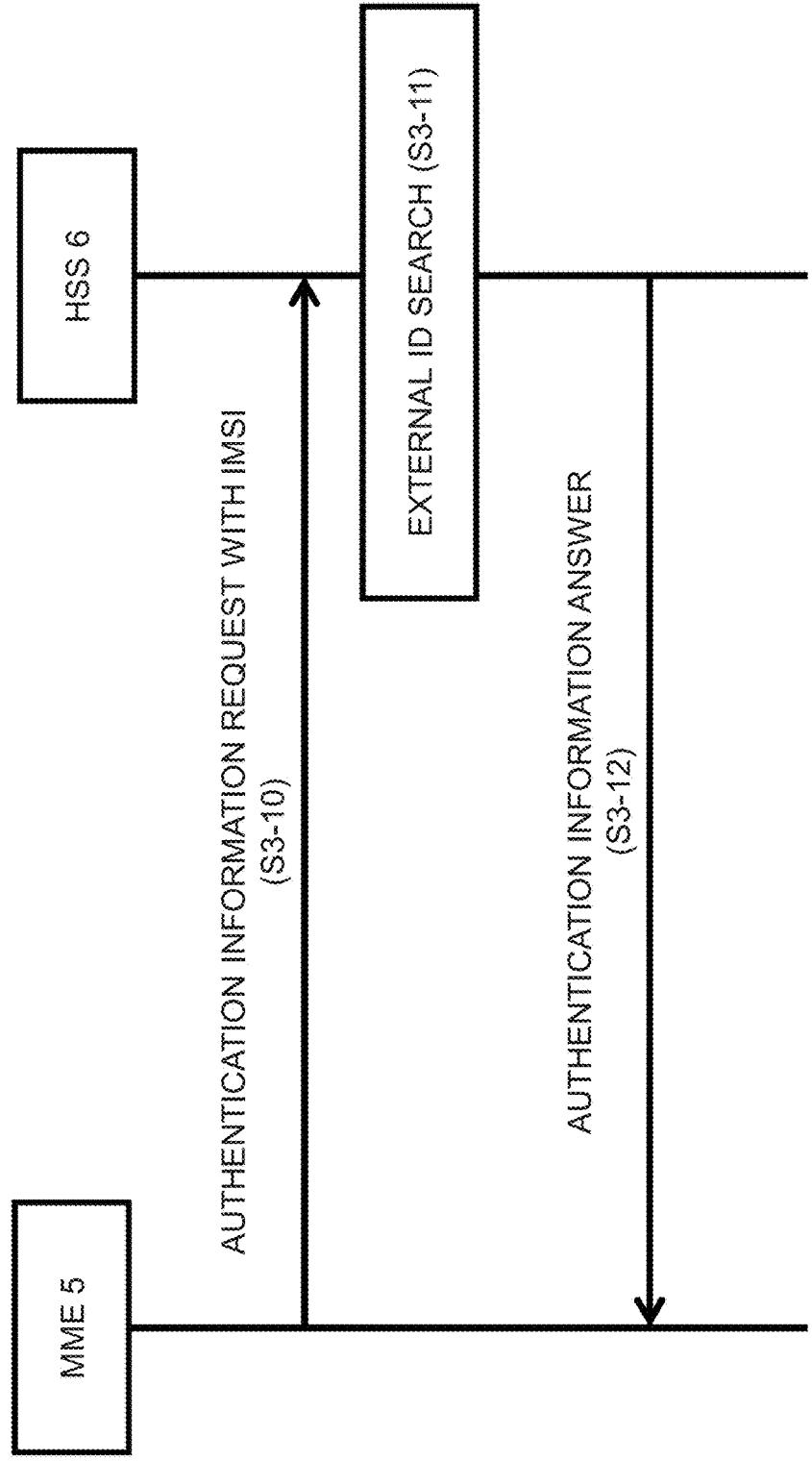
FIG. 9 is a sequence chart showing an MME's operation for identifying a terminal type in the second example of operation in the communication system according to the second exemplary embodiment.

A second example of operation in the second exemplary embodiment will be described with reference to FIGS. 7 to 9. The second example of operation illustrated in FIGS. 7 to 9 is an example in which the present exemplary embodiment is applied to the "Attach Procedure" described in subchapter 5.3.2 of 3GPP specifications (TS23.401 v12.3.0).

Figure 7:
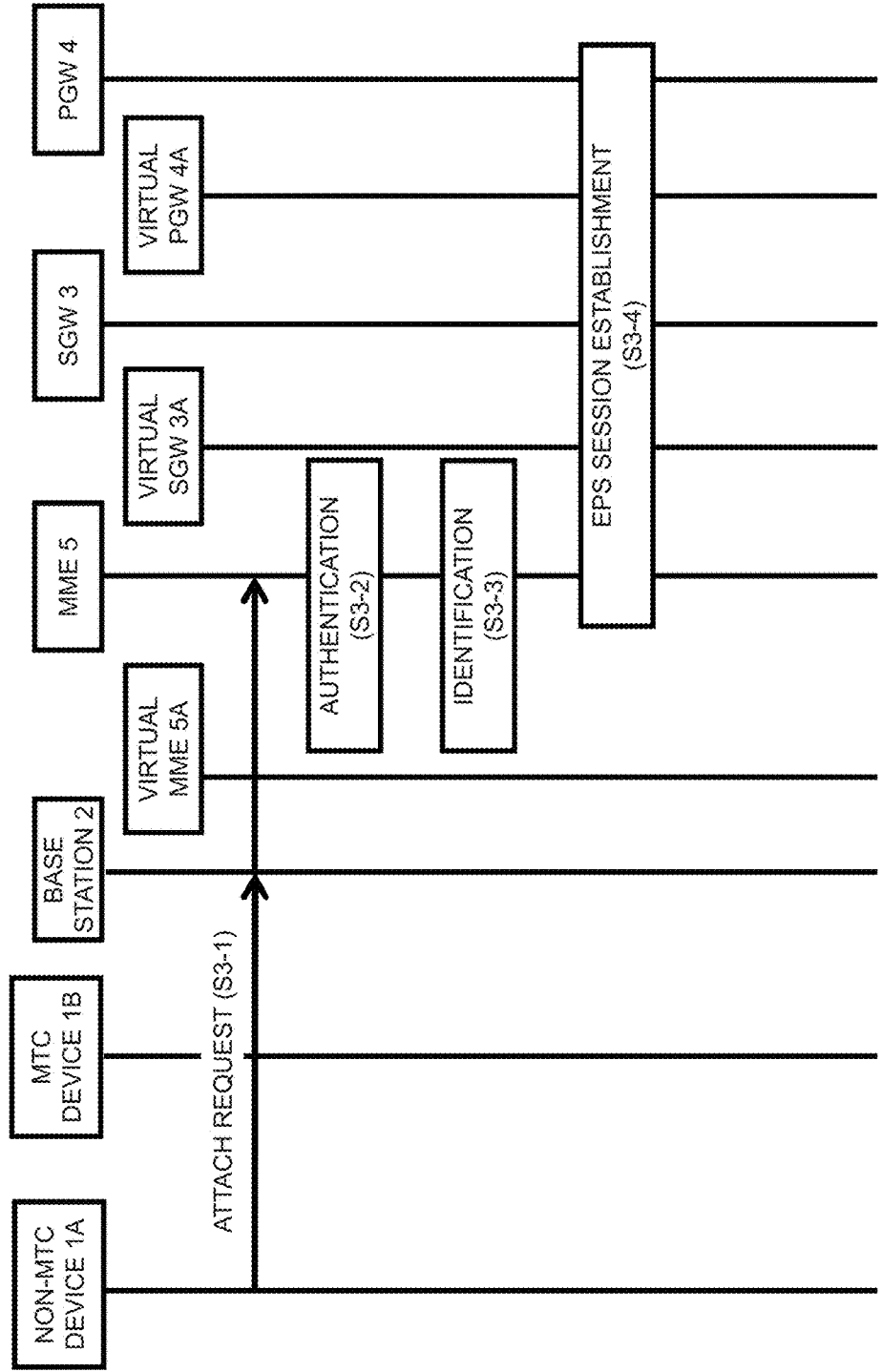
FIG. 7 is a sequence chart showing operation related to a non-MTC device in a second example of operation in the communication system according to the second exemplary embodiment.

FIG. 7 shows an example of operation related to the non-MTC device 1A. Here, when the non-MTC device 1A sends "Attach Request" to the base station 2 (Operation S3-1), the base station 2 sends this "Attach Request" to the MME 5 in the legacy network.

The MME 5, in response to reception of the "Attach Request", performs a terminal authentication procedure (Operation S3-2). In the authentication procedure, the MME 5 performs terminal-type identification (Operation S3-3). The MME 5 identifies the type of the terminal based on an IMSI (International Mobile Subscriber Identity) included in the "Attach Request". The IMSI is the identification information of the terminal.

When the MME 5 determines through the above-described identification procedure that the terminal is not an MTC device, the MME 5 initiates an EPS bearer establishment procedure (Operation S3-4). The EPS bearer establishment procedure is similar to that of the operation example shown in FIG. 6, and therefore a detailed description thereof will be omitted.

Next, a description will be given of an example of the operation of the MME 5 for terminal-type identification in the above-described authentication procedure, with reference to FIG. 9.

Referring to FIG. 9, the MME 5 sends "Authentication Information Request" to an HSS (Home Subscriber Server) 6 (Operation S3-10). The "Authentication Information Request" includes the IMSI.

The HSS 6 manages "External Identifier", which is identification information for allowing an external AS (Application Server) to identify an MTC device. For example, the external AS calls an MTC device (call procedure triggered by external AS), based on "External Identifier". For example, an M2M service provider uses "External Identifier" to identify an MTC device. The HSS 6 manages "External Identifier", for example, in association with IMSI.

The HSS 6, in response to reception of the "Authentication Information Request", searches for an "External Identifier" (Operation S3-11). For example, the HSS 6 searches for an "External Identifier" that is associated with the IMSI included in the "Authentication Information Request".

The HSS 6 sends "Authentication Information Answer" with the result of "External Identifier" search included therein to the MME 5 (Operation S3-12). For example, if the "Authentication Information Answer" includes information indicating that an "External Identifier" has been retrieved, the MME 5 determines that the terminal is an MTC device. Moreover, for example, if the "Authentication Information Answer" does not include information indicating that an "External Identifier" has been retrieved, the MME 5 determines that the terminal is not an MTC device.

Next, a description will be given of an example of operation related to the MTC device 1B, with reference to FIG. 8. Note that Operations S3-5 to S3-7 in FIG. 8 are basically similar to the operations described in FIGS. 7 and 9 above, and therefore a detailed description thereof will be omitted.

When the MME 5 identifies through a terminal identification procedure (Operation S3-7) that the terminal is an MTC device as described above, the MME 5 sends "MME Reselection Indication" to the base station 2 to have the base station 2 reselect an MME (Operation S3-8). For example, the MME 5 sends the "MME Reselection Indication" with information about an MME to be reselected by the base station 2 included therein to the base station 2. The MME 5 can set, for example, the IP address of an MME (virtual MME 5A) in the virtual network in the "MME Reselection Indication".

The base station 2, in response to reception of the "MME Reselection Indication", sends "Attach Request" to the reselected MME (Operation S3-9). Assuming that the base station 2 reselects the virtual MME 5A, the base station 2 sends "Attach Request" to the reselected virtual MME 5A.

The virtual MME 5A, in response to reception of the "Attach Request", initiates a procedure for establishing an EPS bearer in the virtual network (Operation S3-10). The EPS bearer establishment procedure is similar to that of the operation example shown in FIG. 6, and therefore a detailed description thereof will be omitted. The MTC device 1B communicates with the Internet or the like via the EPS bearer established in the virtual network.

Figure 10:
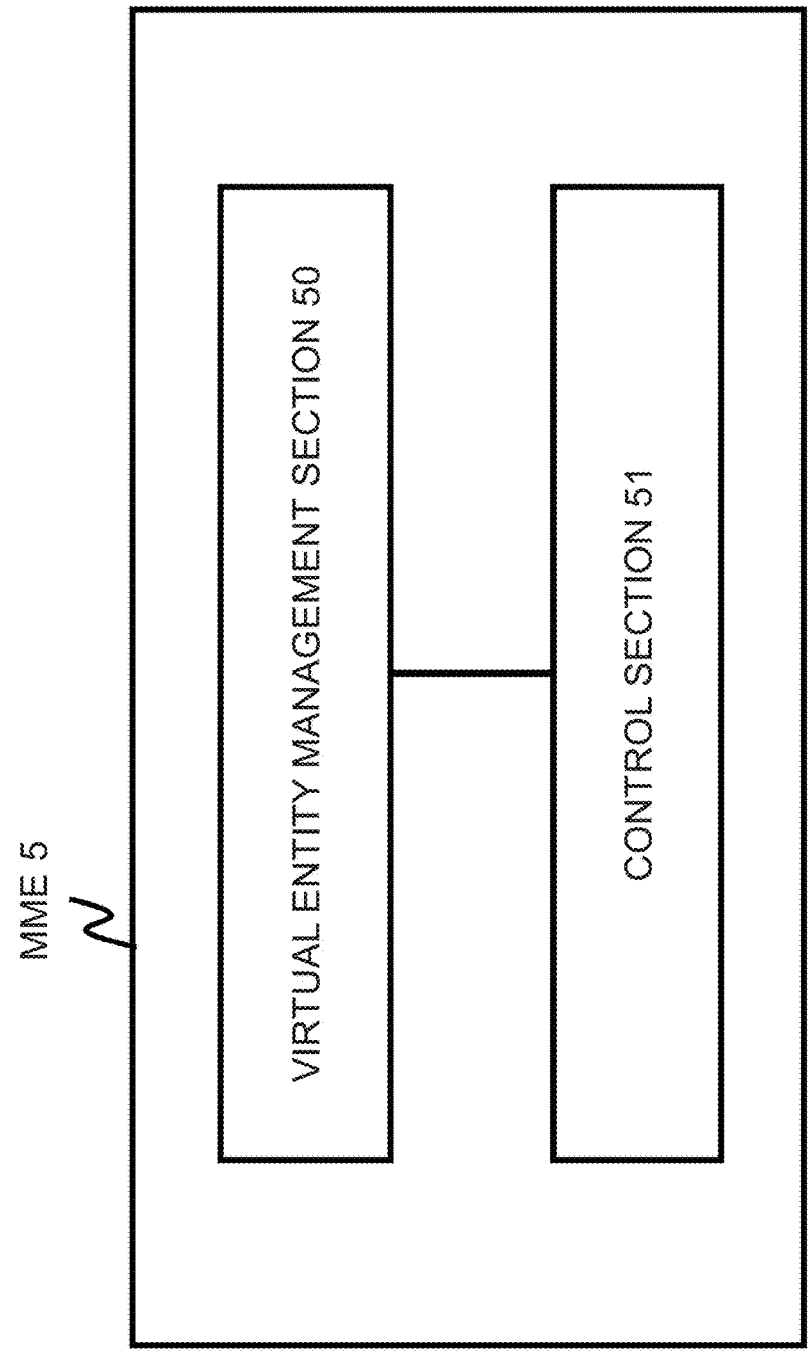
FIG. 10 is a block diagram showing an example of the schematic functional configuration of the MME in the second exemplary embodiment.

In case of the second example of operation shown in FIG. 8, the MME 5 has a function of instructing the base station 2 to reselect an MME, based on the type of a terminal. For example, the MME 5 includes a virtual entity management section 50 and a control section 51, as shown in FIG. 10.

The virtual entity management section 50 manages, for example, an address (IP address or the like) of the virtual MME 5A deployed in the virtual network.

The control section 51 acquires the address of the virtual MME 5A from the virtual entity management section 50 when a terminal that is the source of "Attach Request" is an MTC device. The control section 51 sends the acquired IP address to the base station 2 to instruct it to reselect an MME. Thus, the base station 2 retransmits the "Attach Request" as described above to the virtual MME 5A corresponding to the IP address notified from the control section 51.

<Third Operation Example>

Next, a third example of operation in the second exemplary embodiment will be described with reference to FIG. 11. Note that Operations S4-1 to S4-4 in FIG. 11 are similar to Operations S2-1 to S2-4 in FIG. 6 described above, and therefore a detailed description thereof will be omitted.

If a terminal is the MTC device 1B as described above, an MTC device identifier is included in "RRC Connection Request" sent to the base station 2. Accordingly, the base station 2 can select an MME, depending on whether or not an MTC device identifier is included in "RRC Connection Request". For example, when an MTC device identifier is included in "RRC Connection Request", the base station 2 selects an MME in the virtual network (virtual MME 5A).

Figure 11:
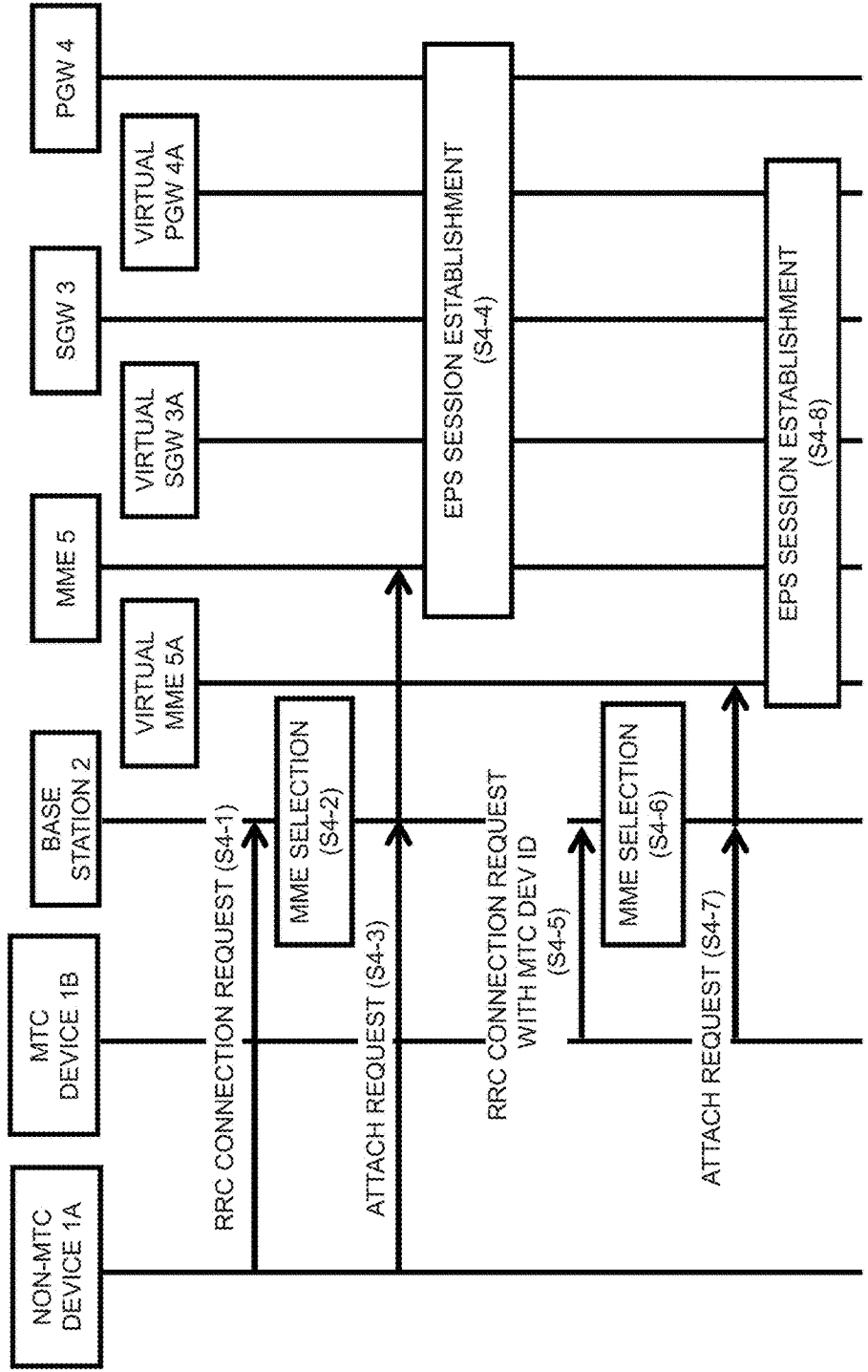
FIG. 11 is a sequence chart showing a third example of operation in the communication system according to the second exemplary embodiment.

Referring to FIG. 11, when the MTC device 1B sends "RRC Connection Request" with an MTC device identifier included therein to the base station 2 (Operation S4-5), the base station 2 selects the virtual MME 5A in the virtual network (Operation S4-6). Thereafter, as described in FIG. 6, when the MTC device 1B sends a message for requesting connection to a network ("Attach Request") to the base station 2, the base station 2 sends this "Attach Request" to the virtual MME 5A (Operation S4-7), and the MME 5A, in response to reception of the "Attach Request", initiates an EPS bearer establishment procedure (Operation S4-8).

In the above-described examples of the second exemplary embodiment, the base station 2 or MME 5 selects a network for the terminal 1 to connect to, based on the type of the terminal 1 (i.e., whether or not it is an MTC device). However, the second exemplary embodiment is not limited to the above-described examples. The base station 2 or MME 5 may select a network for the terminal 1 to connect to, based on a policy related to the type of the terminal 1. For example, it is also possible that the base station 2 or MME 5 selects a network, based on the user attribute of the terminal 1 (e.g., whether or not the user is a premium user), the charging property of the terminal 1 (e.g., whether the charging is meter-rate charging or flat-rate charging), or the like.

3. Third Exemplary Embodiment

According to a third exemplary embodiment of the present invention, a base station 2 can select a network node for a terminal 1 to connect to, based on the type of communication traffic. The third exemplary embodiment is applicable to the first or second exemplary embodiment, or any of the under-described embodiments.

3.1) System Architecture

Figure 12:
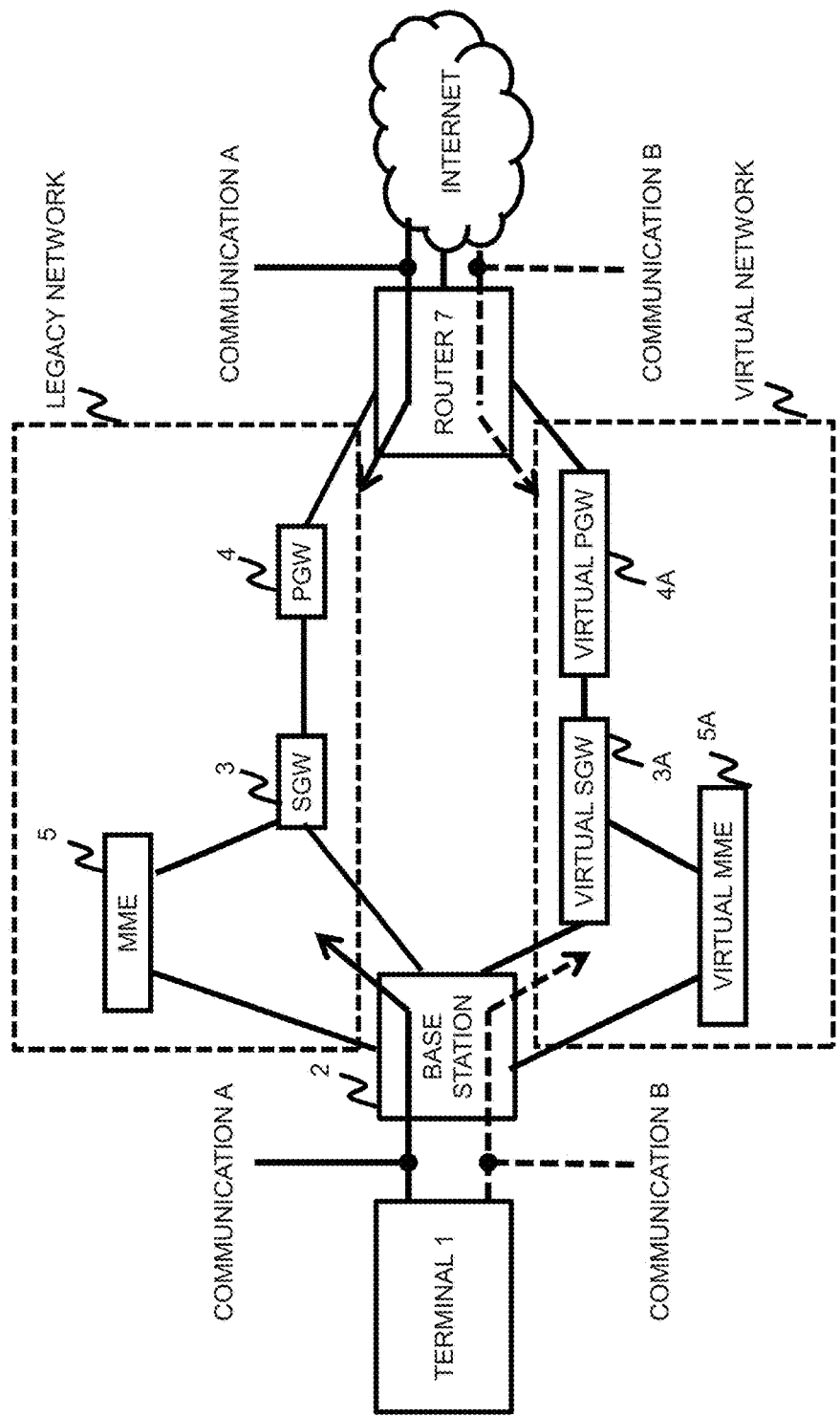
FIG. 12 is a system architecture diagram showing an example of a communication system according to a third exemplary embodiment of the present invention.

As illustrated in FIG. 12, the base station 2 and a router 7 can select a network through which a communication traffic between the terminal 1 and an external network passes, from a legacy network and a virtual network. The architectures of the legacy network and virtual network are similar to those of the first and second exemplary embodiments, and therefore details thereof will be omitted.

Figure 13:
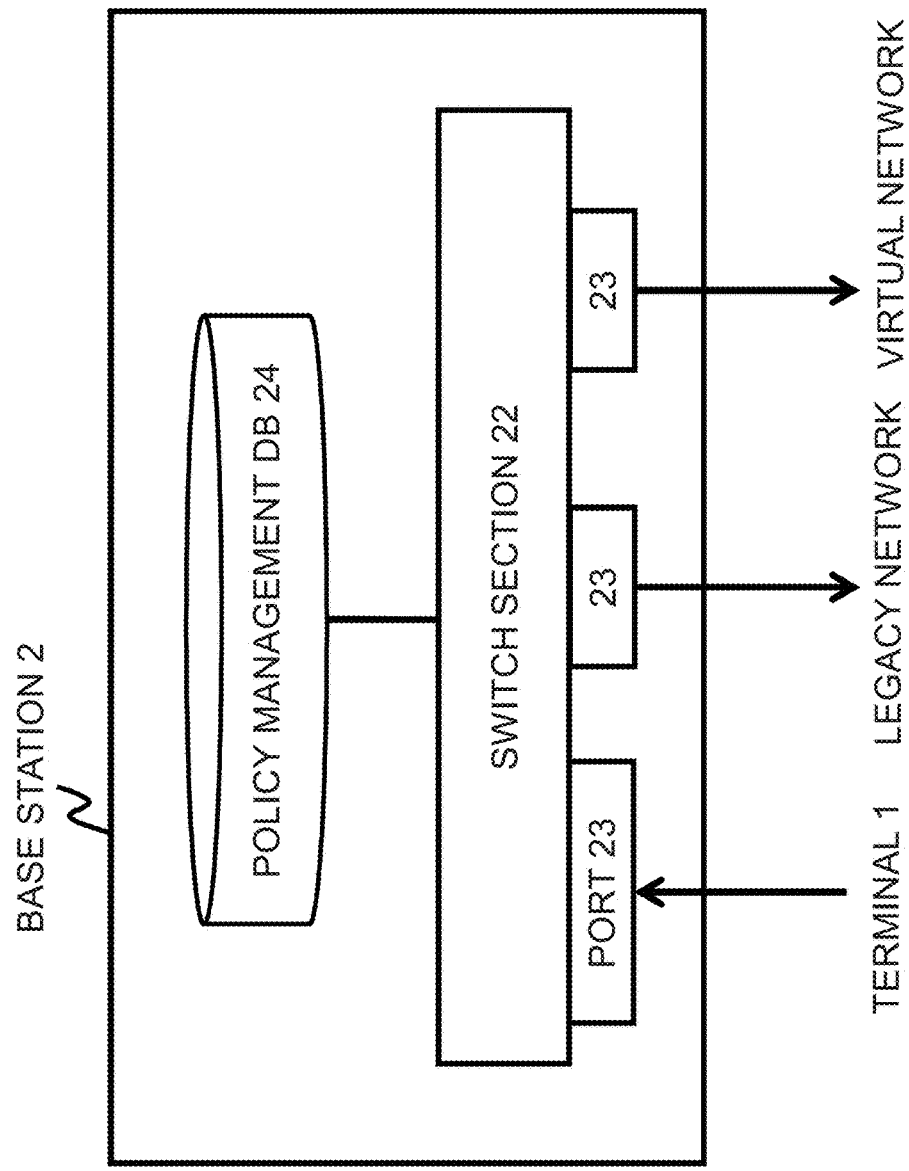
FIG. 13 is a block diagram showing an example of the schematic functional configuration of a base station according to the third exemplary embodiment.

The base station 2 has a switch function capable of switching the forwarding destination of a communication traffic, and may have the configuration illustrated in FIG. 2, or may have a configuration illustrated in FIG. 13. In the example of FIG. 13, the base station 2 includes a switch section 22 and a policy management DB (Data Base) 24, and the switch section 22 includes a plurality of ports 23.

The switch section 22 can switch the forwarding destination of a communication traffic, based on the communication type. The switch section 22 may be, for example, a virtual switch (vSwitch) configured by using software.

The policy management DB 24 has a data structure illustrated in FIG. 14, and includes a rule for identifying a communication traffic ("Identification Rule") and a destination to which the communication traffic that matches the rule is forwarded ("Destination").

The switch section 22 refers to the policy management DB 24 and identifies the type of a communication traffic that has entered a port 23. More specifically, the switch section 22 compares a port number where a communication traffic has entered (e.g., port number "80" in case of HTTP communication, or port number "25" in case of SMTP communication) with "Identification Rule" in the policy management DB 24, and searches for an "Identification Rule" by using the port number where the communication traffic has entered. The switch section 22 forwards the input communication traffic to a "Destination" associated with the retrieved "Identification Rule", that is, a port 23 corresponding to a selected network, thus sending the communication traffic to the selected network. If an "Identification Rule" corresponding to the communication traffic is not found in the policy management DB 24, the switch section 22 selects a default forwarding destination (e.g., legacy network) and forwards the communication traffic to a port 23 corresponding to the legacy network.

Figure 15:
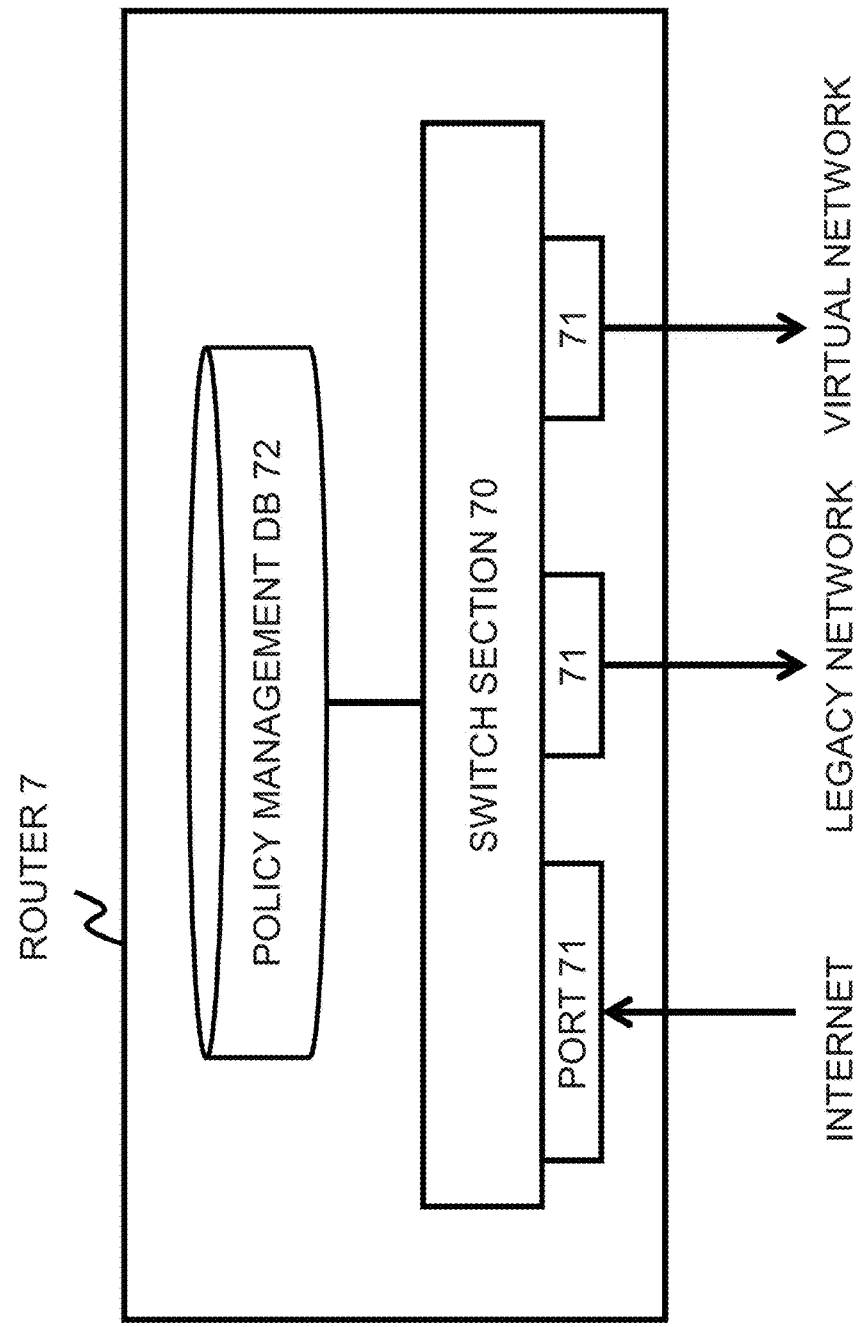
FIG. 15 is a block diagram showing an example of the schematic functional configuration of a router according to the third exemplary embodiment.

As illustrated in FIG. 15, the router 7 has a configuration and functions similar to those of the base station 2. That is, the router 7 includes a switch section 70 and a policy management DB 72, which have configurations and functions similar to those of the switch section 22 and policy management DB 24 of the base station 2, respectively.

3.2) Operation

Figure 16:
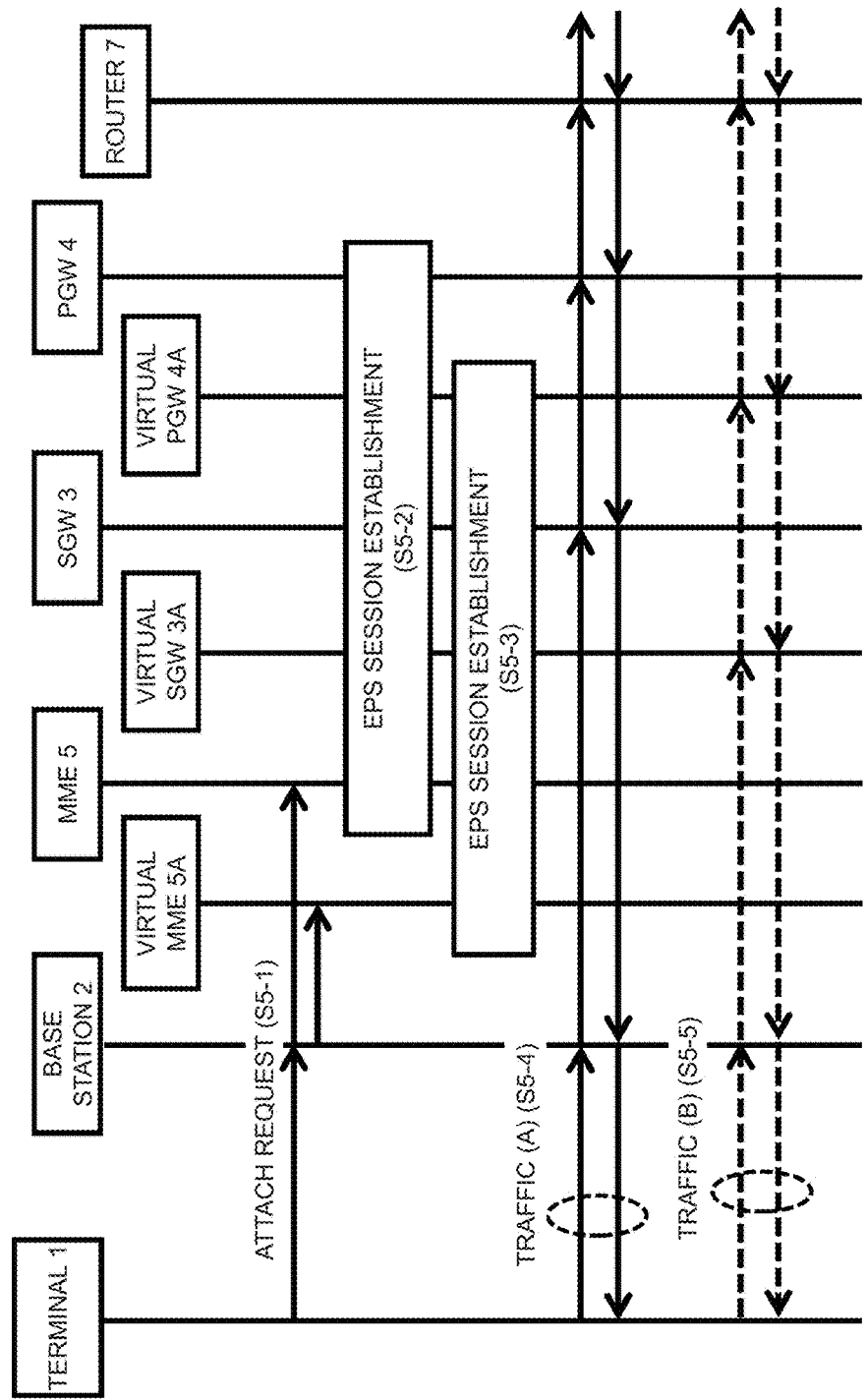
FIG. 16 is a sequence chart showing an example of operation in the communication system according to the third exemplary embodiment.

As illustrated in FIG. 16, when the base station 2 receives "Attach Request" from the terminal 1, the base station 2 forwards it to each of the MME 5 in the legacy network and the virtual MME 5A in the virtual network (Operation S5-1).

When receiving the "Attach Request", each of the MME 5 and virtual MME 5A initiates an EPS bearer establishment procedure (Operation S5-2, Operation S5-3). Initiation of the EPS bearer establishment procedure by the MME 5 causes control signals to be exchanged between the SGW 3, PGW 4, MME 5, and base station 2, and an EPS bearer is established. Similarly, initiation of the EPS bearer establishment procedure by the virtual MME 5A causes control signals to be exchanged between the virtual SGW 3A, virtual PGW 4A, virtual MME 5A, and base station 2, and an EPS bearer is established.

Note that it is also possible that the base station 2, when receiving "Attach Request" from the terminal 1, sends it only to the MME 5 in the legacy network (Operation S5-1). The MME 5, in response to reception of the "Attach Request", initiates an EPS bearer establishment procedure in both the legacy network and virtual network (Operation S5-2, Operation S5-3). For example, the MME 5, in response to reception of the "Attach Request", sends a control signal related to EPS bearer establishment to the SGW 3 and virtual SGW 3A.

When the EPS bearers are established for the terminal 1 in both the legacy network and virtual network as described above, the base station 2 and router 7 switch an EPS bearer through which the communication traffic related to the terminal 1 travels, based on the communication type.

For example, in the example of FIG. 16, when the communication type of a communication traffic is "Traffic (A)", the base station 2 and router 7 forward this communication traffic to the EPS bearer established in the legacy network. When the communication type is "Traffic (B)", the base station 2 and router 7 forward this communication traffic to the EPS bearer established in the virtual network (Operation S5-4, Operation S5-5).

4. Fourth Exemplary Embodiment

According to a fourth exemplary embodiment of the present invention, a network node for a terminal 1 to connect to is selected based on information related to the location of the terminal 1. The fourth exemplary embodiment is applicable to any of the first to third exemplary embodiments and under-described embodiments.

4.1) System Architecture

Figure 17:
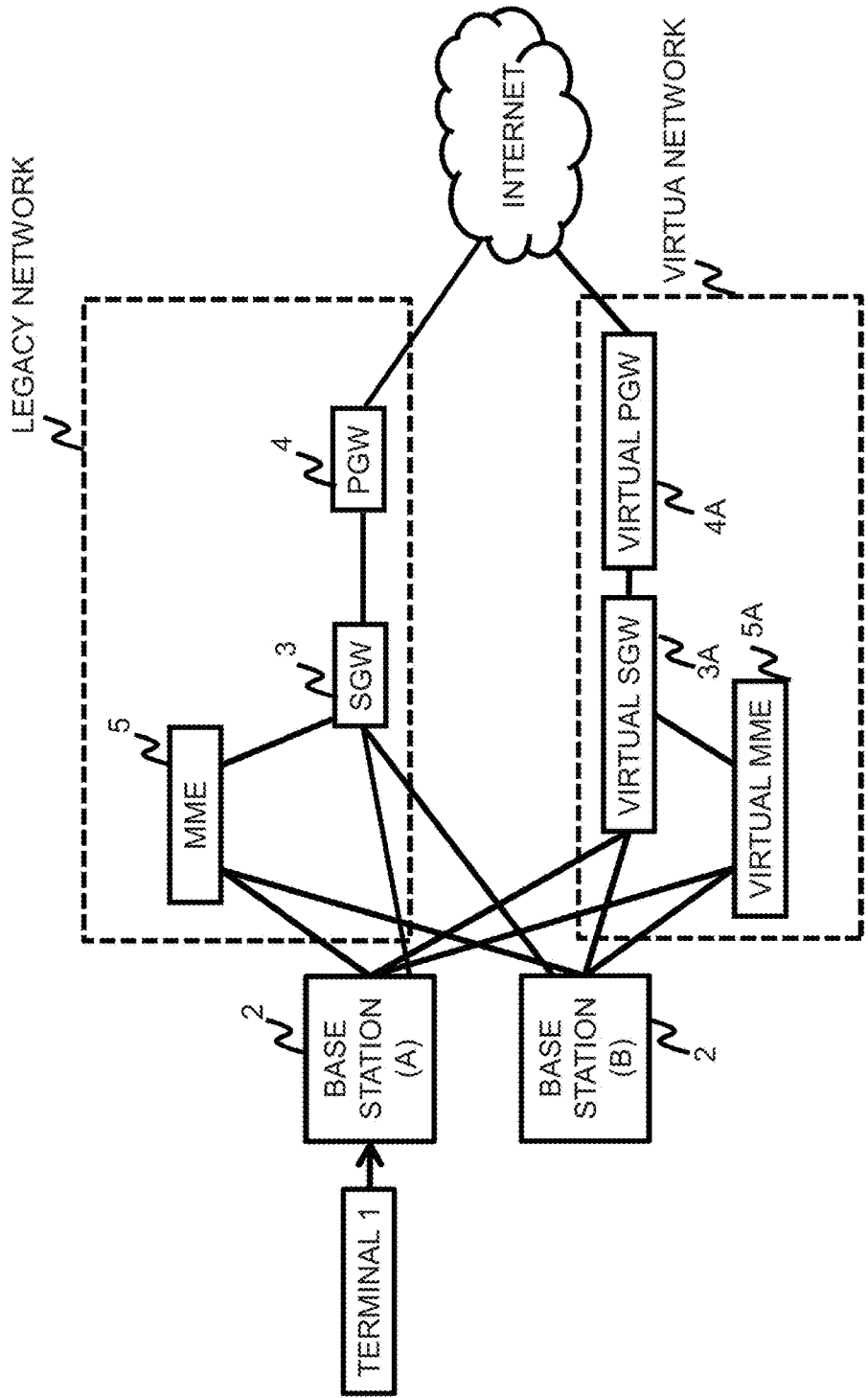
FIG. 17 is a system architecture diagram showing an example of a communication system according to a fourth exemplary embodiment of the present invention.

A communication system illustrated in FIG. 17 includes a plurality of networks (here, a legacy network and a virtual network) and a plurality of base stations, and a network to connect to is selected depending on the geographical location of the terminal 1. The architectures of the legacy network and virtual network are as described already, and therefore details thereof will be omitted. Hereinafter, it is assumed that a network to which the terminal 1 can be connected is determined to be either the legacy network or the virtual network, depending on the location of the terminal 1. For example, the terminal 1 is connected to the legacy network when it is staying in an area covered by a base station 2(A), and is connected to the virtual network when it is staying in an area covered by a base station 2(B).

4.2) Operation

<First Operation Example>

Figure 18:
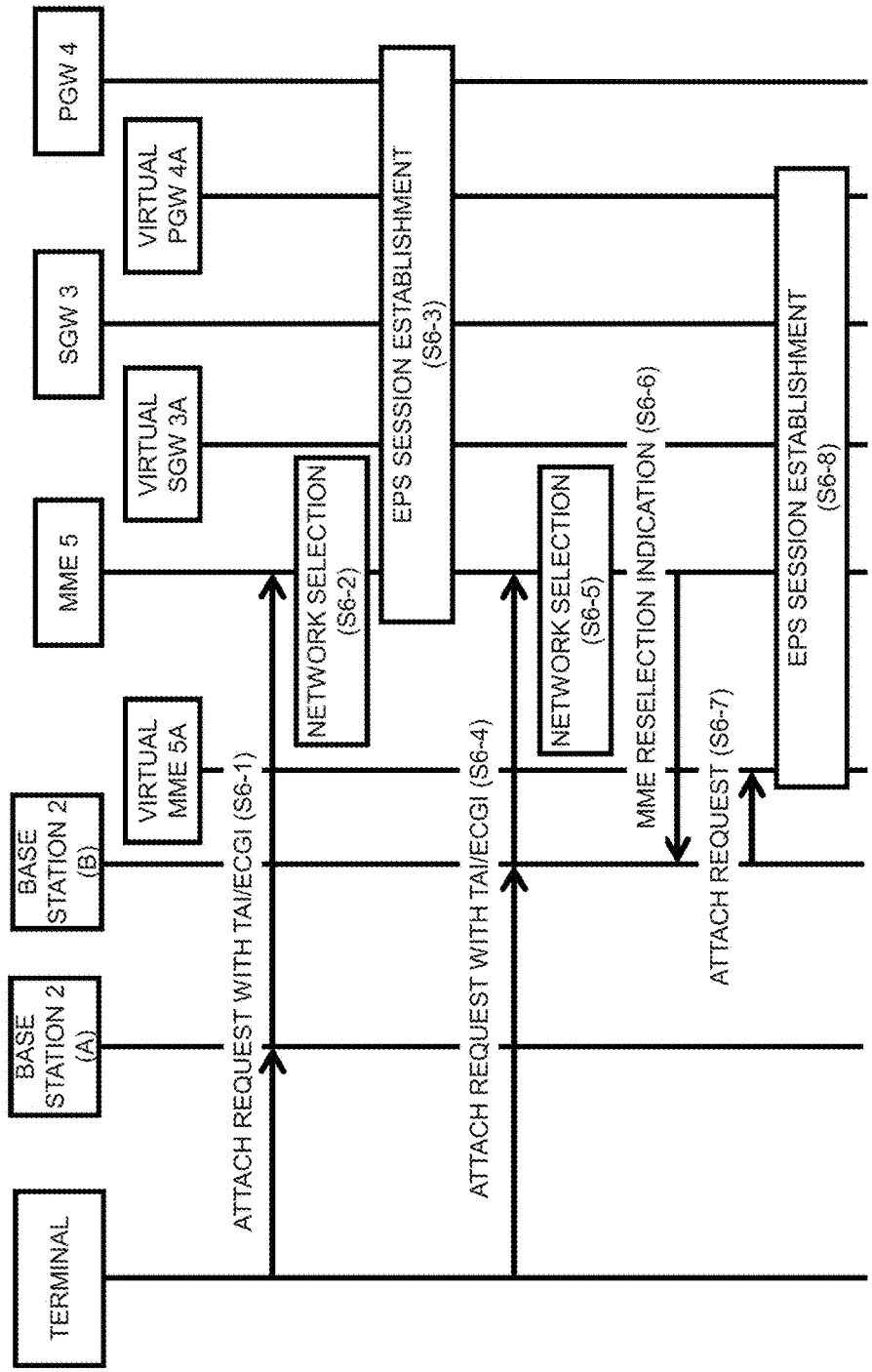
FIG. 18 is a sequence chart showing an example of operation in the communication system according to the fourth exemplary embodiment.

Referring to FIG. 18, it is assumed that the terminal 1 sends "Attach Request" to the base station 2(A), and in response to this, the base station 2(A) sends the "Attach Request" to a default MME (here, MME 5 in the legacy network) (Operation S6-1). The "Attach Request" includes a TAI (Tracking Area ID) and an ECGI (E-UTRAN Cell Global ID). The TAI is the identifier of an area where the terminal 1 has made location registration. The ECGI is the identifier of the cell of a base station 2 to which the terminal 1 has connected.

The MME 5 selects a network for the terminal 1 to connect to, based on at least one of the TAI and ECGI included in the "Attach Request" (Operation S6-2). The MME 5 in this operation example has, for example, the above-described configuration and functions illustrated in FIG. 10. That is, the control section 51 of the MME 5 selects a network for the terminal 1 to connect to, based on at least one of the TAI and ECGI. The control section 51 has, for example, policy information indicating a network associated with the location of the terminal 1 (TAI or ECGI). The control section 51 refers to the policy information and searches for a network associated with the TAI or ECGI included in the "Attach Request". If the virtual network is associated with the TAI or ECGI included in the "Attach Request", the control section 51 retrieves the address of the virtual MME 5A from the virtual entity management section 50. The control section 51 notifies the retrieved address of the virtual MME 5A to the base station 2. The base station 2 retransmits the "Attach Request" to the notified address of the virtual MME 5A.

In the example of FIG. 18, the legacy network is associated with the TAI or ECGI corresponding to the base station 2(A). Accordingly, in Operation S6-2, the MME 5 selects the legacy network as a network for the terminal 1 to connect to. Since the MME 5 is deployed in the legacy network, the MME 5 initiates an EPS bearer establishment procedure without instructing the base station 2(A) to reselect an MME (Operation S6-3), and an EPS bearer is established in the legacy network. The terminal 1 performs communication via the EPS bearer established in the legacy network.

On the other hand, it is assumed that the terminal 1 sends "Attach Request" to the base station 2(B), and in response to this, the base station 2(B) makes connection and sends the "Attach Request" to the MME 5 in the legacy network (Operation S6-4).

The MME 5 searches for a network associated with a TAI or an ECGI included in the "Attach Request". In the example of FIG. 18, the virtual network is associated with the TAI or ECGI corresponding to the base station 2(B). Accordingly, the MME 5 selects the virtual network as a network for the terminal 1 to connect to (Operation S6-5).

Upon selection of the virtual network, the MME 5 sends an instruction including the address of the virtual MME 5A ("MME Reselection Indication") to the base station 2(B) (Operation S6-6).

The base station 2(B) retransmits the "Attach Request" to the indicated address, that is, the virtual MME 5A (Operation S6-7).

The virtual MME 5A, when receiving the "Attach Request", initiates an EPS bearer establishment procedure (Operation S6-8), whereby an EPS bearer is established in the virtual network. The terminal 1 performs communication via the EPS bearer established in the virtual network.

<Second Operation Example>

Figure 19:
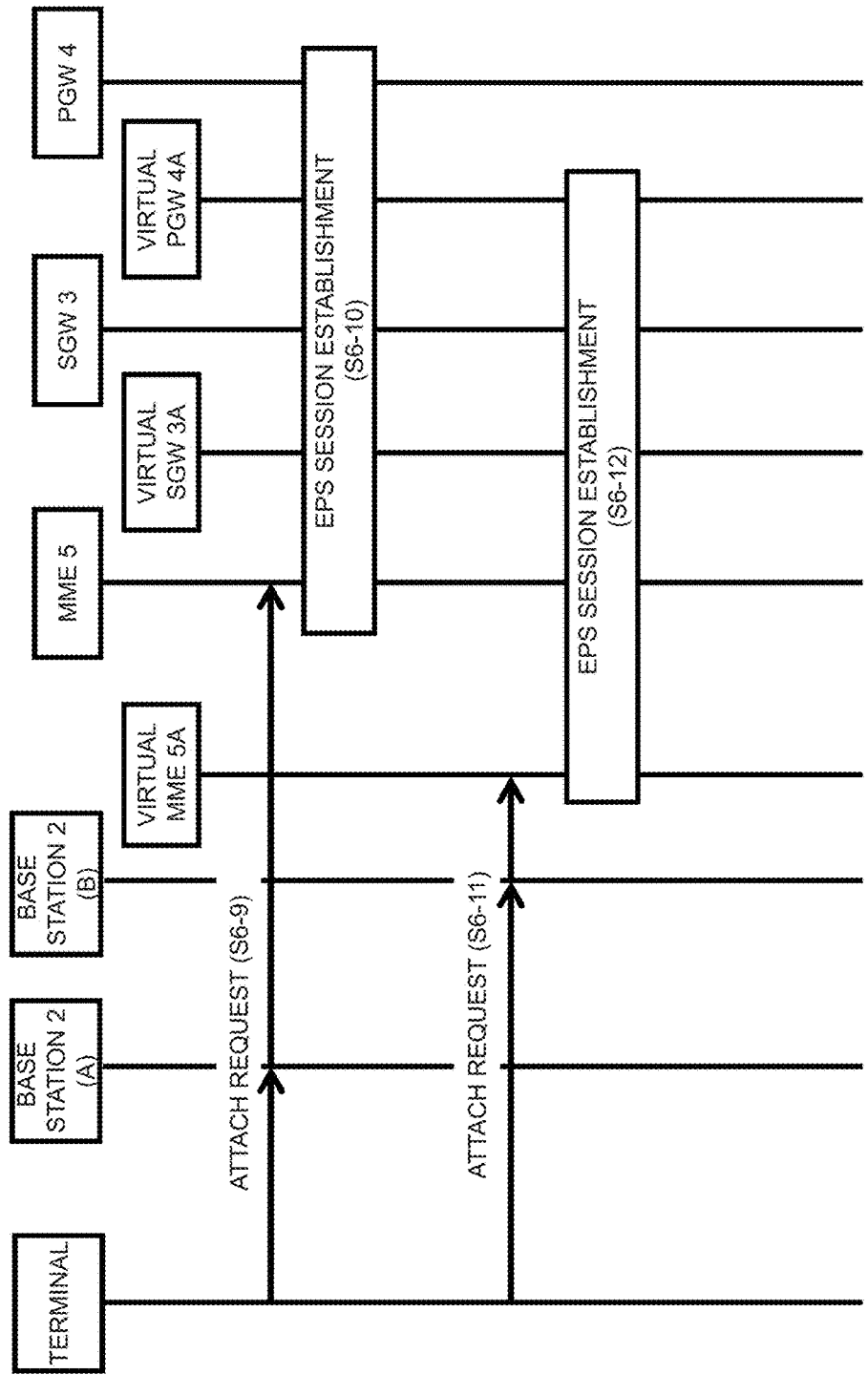
FIG. 19 is a sequence chart showing another example of operation in the communication system according to the fourth exemplary embodiment.

In another example of operation in the present exemplary embodiment illustrated in FIG. 19, an MME is associated with each base station 2 beforehand. For example, the MME 5 in the legacy network and the virtual MME 5A in the virtual network are associated with the base stations 2(A) and 2(B), respectively.

The base station 2(A) sends "Attach Request" sent from the terminal 1 to the MME 5 associated with the base station 2(A) (Operation S6-9). The MME 5 receives the "Attach Request", thereby initiating a procedure for establishing an EPS bearer in the legacy network (Operation S6-10). Upon initiation of the EPS bearer establishment procedure by the MME 5, control signals are exchanged between the SGW 3, PGW 4, MME 5, and base station 2, and an EPS bearer is established.

The base station 2(B) sends "Attach Request" sent from the terminal 1 to the virtual MME 5A associated with the base station 2(B) (Operation S6-11). The virtual MME 5A receives the "Attach Request", thereby initiating a procedure for establishing an EPS bearer in the virtual network (Operation S6-12). Upon initiation of the EPS bearer establishment procedure by the virtual MME 5A, control signals are exchanged between the virtual SGW 3A, virtual PGW 4A, virtual MME 5A, and base station 2, and an EPS bearer is established.

5. Fifth Exemplary Embodiment

According to a fifth exemplary embodiment of the present invention, a control apparatus centrally manages policies for network selection. Accordingly, efficiency in operation and management of the policies for network selection or network node selection is enhanced. The fifth exemplary embodiment is applicable to any of the first to fourth exemplary embodiments and under-described embodiments.

Figure 20:
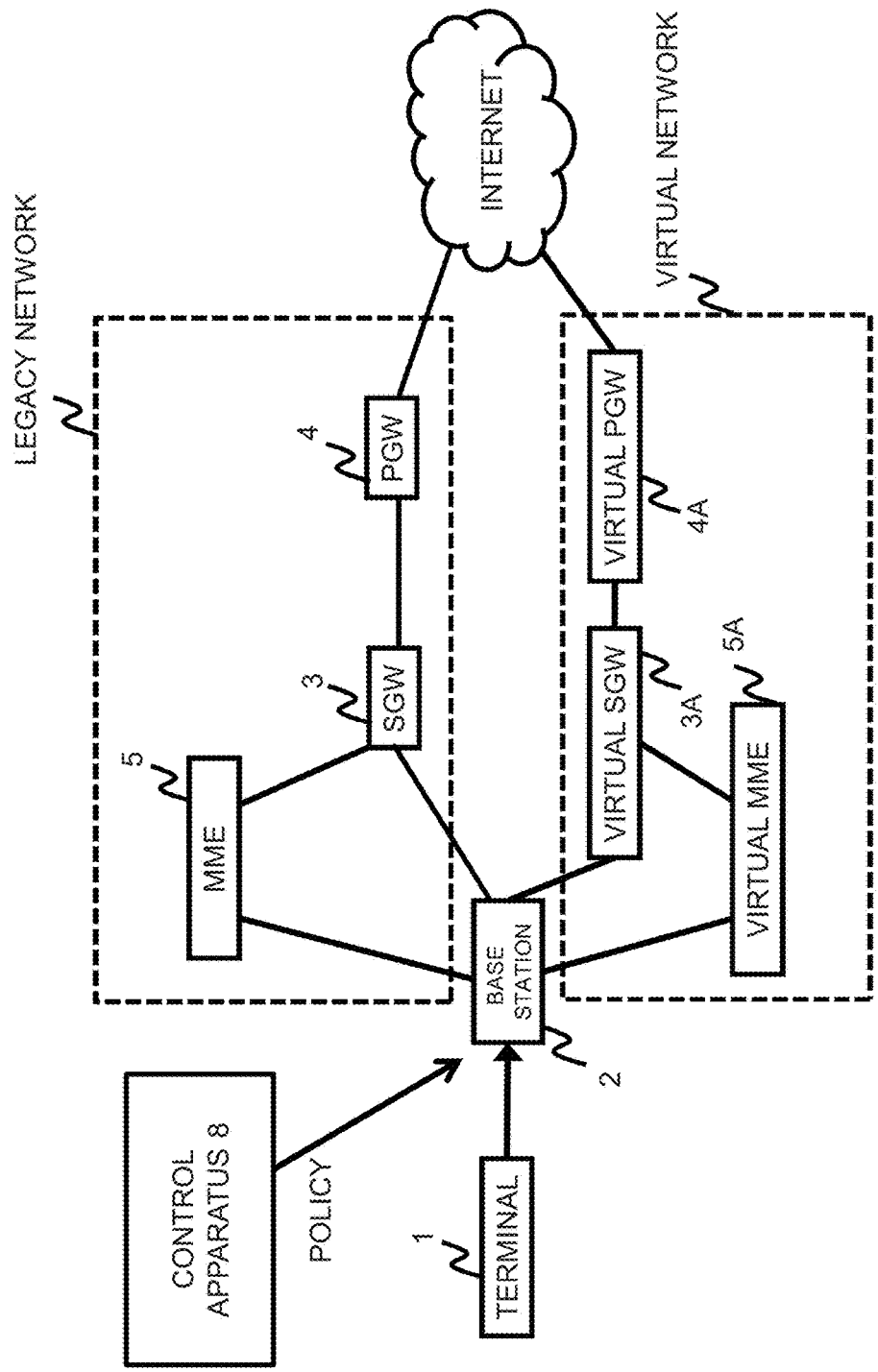
FIG. 20 is a system architecture diagram showing an example of a communication system according to a fifth exemplary embodiment of the present invention.

A communication system according to the fifth exemplary embodiment illustrated in FIG. 20 includes a plurality of networks (here, a legacy network and a virtual network), a terminal 1, a base station 2, and a control apparatus 8 having a function of notifying a policy for network selection to the base station 2 and/or an MME. The architectures of the legacy network and virtual network are as described already, and therefore the same reference signs are given thereto and details thereof will be omitted.

<Control Apparatus>

Figure 21:
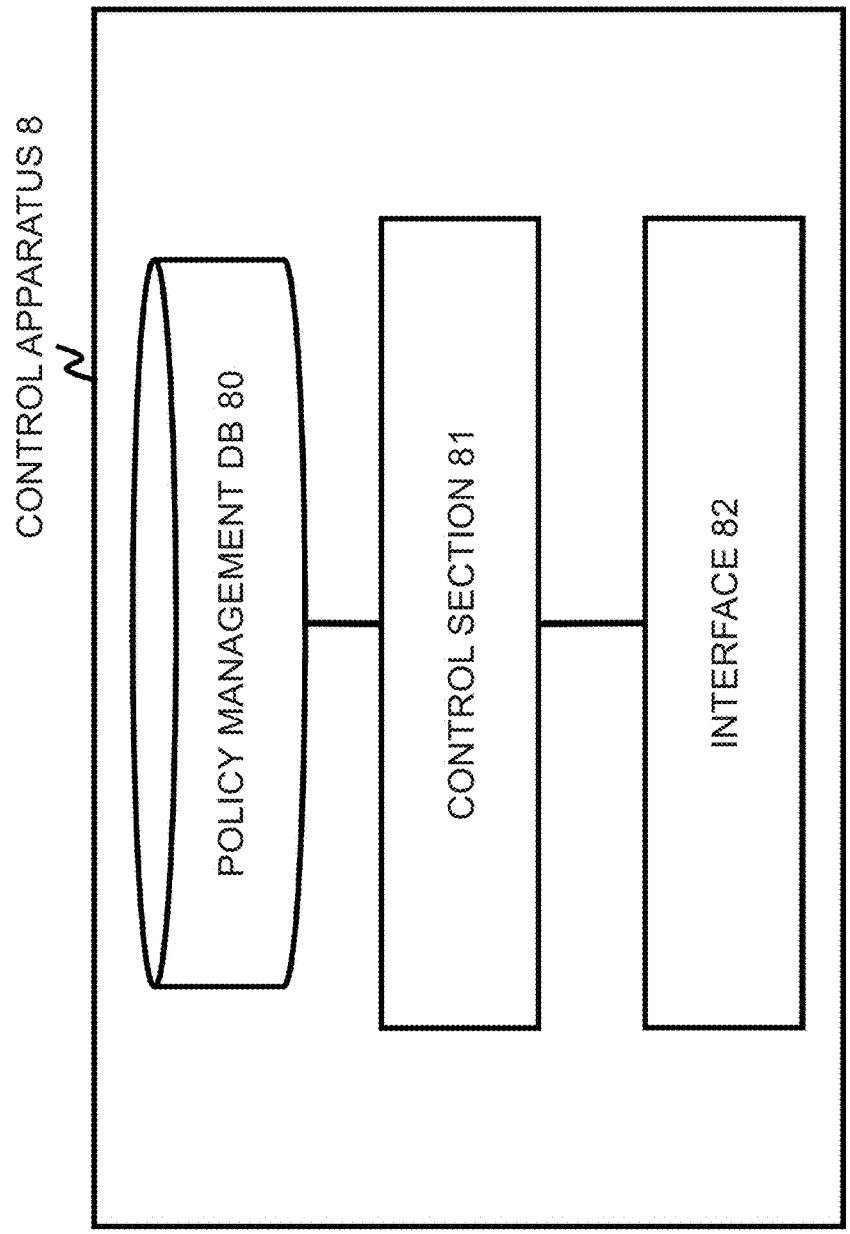
FIG. 21 is a block diagram showing an example of the schematic functional configuration of a control apparatus according to the fifth exemplary embodiment.

Referring to FIG. 21, the control apparatus 8 includes a policy management DB (Data Base) 80, a control section 81, and an interface 82.

The interface 82 is an interface for communicating with the base station 2 and MME 5. For example, the control apparatus 8 can communicate with the base station 2 and MME 5 based on a predetermined protocol via the interface 82. The policy management DB 80 manages policies for network selection. For example, the network operator enters a policy in the policy management DB 80. The control section 81 refers to the policy management DB 80 and notifies a policy to the base station 2 and MME 5 via the interface 82.

The control apparatus 8 is, for example, a SON (Self Organizing Network) server, or may be an operation and management apparatus used by the network operator.

<Policy Management DB>

The policy management DB 80 manages, for example, a policy used for the virtual network to offload a load on the legacy network. Examples of the policy stored in the policy management DB 80 include the following.

A. Policy Related to Terminal Type
  Connect MTC devices to the virtual network
  Connect non-MTC devices to the legacy network
  Connect predetermined MTC devices (e.g., smart meters) to the virtual network
  Connect MTC devices belonging to a predetermined MTC device group to the virtual network
  Connect terminals 1 corresponding to a predetermined user attribute (e.g. premium user) to the legacy network
  Connect terminals 1 corresponding to a predetermined user attribute (e.g., general user) to the virtual network
  Connect the terminals 1 of users whose communication amounts exceed a predetermined value to the virtual network
  Make a policy effective only within a predetermined period of time (e.g., from 1:00 am to 4:00 am) (This policy is used in combination with at least one of the above-mentioned policies.)

B. Policy Related to Communication Traffic Type
  Forward communication traffic related to a predetermined application (e.g., SNS application) to the virtual network
  Forward communication traffic related to telephone calls to the legacy network
  Forward communication traffic related to telephone calls to either the virtual network or the legacy network in a round-robin manner for each user
  Forward part of communication traffic related to a predetermined application (e.g., SNS application) to the virtual network
  Forward communication traffic related to a predetermined application (e.g., SNS application) to either the virtual network or the legacy network in a round-robin manner for each user
  Connect communication traffic corresponding to a predetermined charging characteristic (e.g., flat-rate charging) to the virtual network
  Connect communication traffic corresponding to a predetermined charging characteristic (e.g., meter-rate charging) to the legacy network
  Forward communication traffic related to a predetermined QoS characteristic to the virtual network
  Make a policy effective only within a predetermined period of time (e.g., from 1:00 am to 4:00 am) (This policy is used in combination with at least one of the above-mentioned policies.)

C. Policy Related to Terminal Location
  Connect terminals 1 connected to a predetermined base station to the virtual network
  Connect terminals 1 connected to a base station corresponding to a predetermined event or predetermined location (a shopping mall or the like) to the virtual network
  Connect terminals 1 connected to a predetermined cell to the virtual network Connect terminals 1 connected to a cell corresponding to a predetermined event or predetermined location (a shopping mall or the like) to the virtual network Make a policy effective only within a predetermined period of time (e.g., from 1:00 am to 4:00 am) (This policy is used in combination with at least one of the above-mentioned policies.)

The base station 2 and MME 5 select a network or a network node by any of the methods described in the above exemplary embodiments, based on the received policy. The base station 2 and MME 5 can use each of the above-mentioned policies individually, or also can use the above-mentioned policies in combination.

<Base Station>

Figure 22:
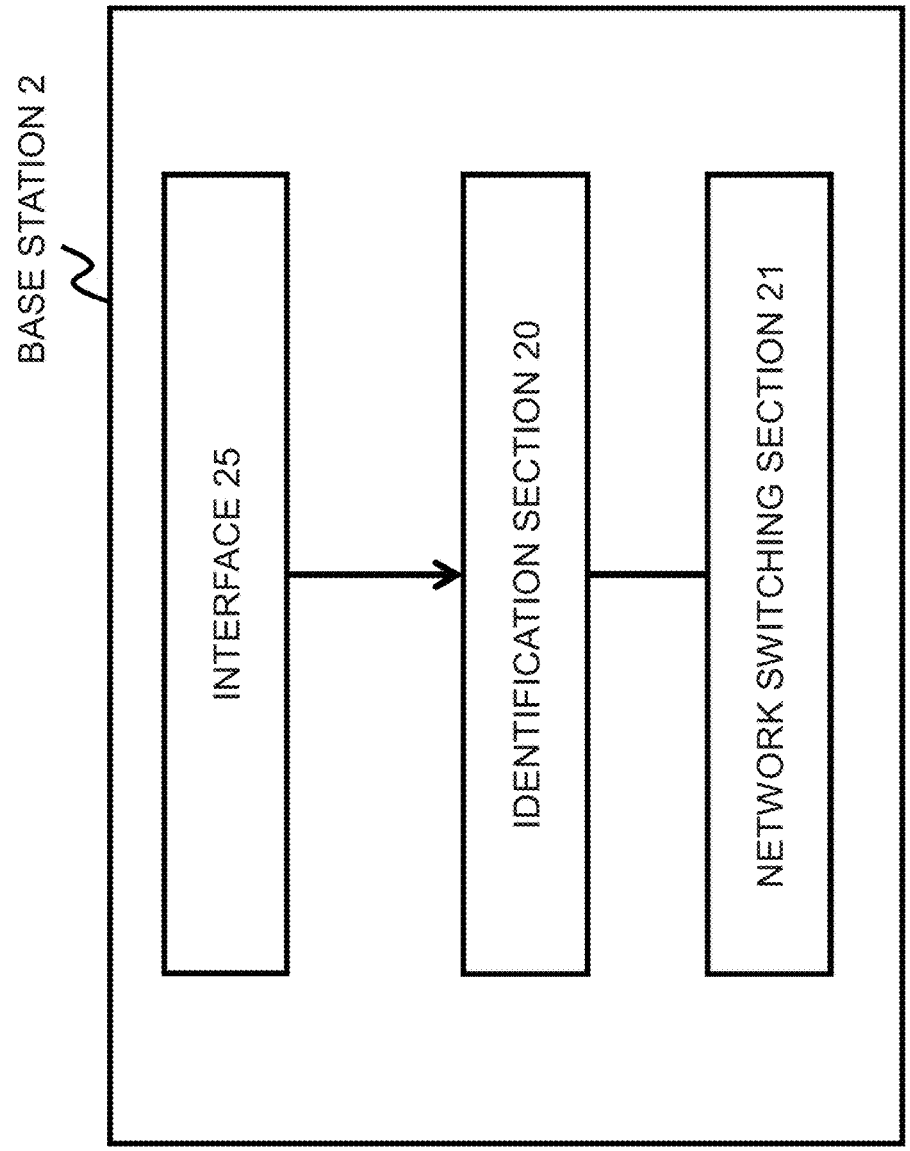
FIG. 22 is a block diagram showing an example of the schematic functional configuration of a base station according to the fifth exemplary embodiment.

Referring to FIG. 22, it is assumed that the base station 2 communicates with the control apparatus 8 via an interface 25. When the base station 2 receives a policy from the control apparatus 8 via the interface 25, the base station 2 stores the received policy in the identification section 20. The identification section 20 selects a network based on the received policy. Moreover, the identification section 20 may select a network node based on the received policy.

The MME 5 may have an interface for communicating with the control apparatus 8, similarly to the base station 2. The MME 5 receives a policy from the control apparatus 8 via the interface and selects a network based on the received policy. The MME 5 may select a network node based on the received policy.

6. Sixth Exemplary Embodiment

According to a sixth exemplary embodiment of the present invention, a control apparatus can perform resource provisioning in a virtual network, whereby efficiency in operation and management of the virtual network can be enhanced. The sixth exemplary embodiment is applicable to any of the first to fifth exemplary embodiments and under-described embodiments.

6.1) System Architecture

Figure 23:
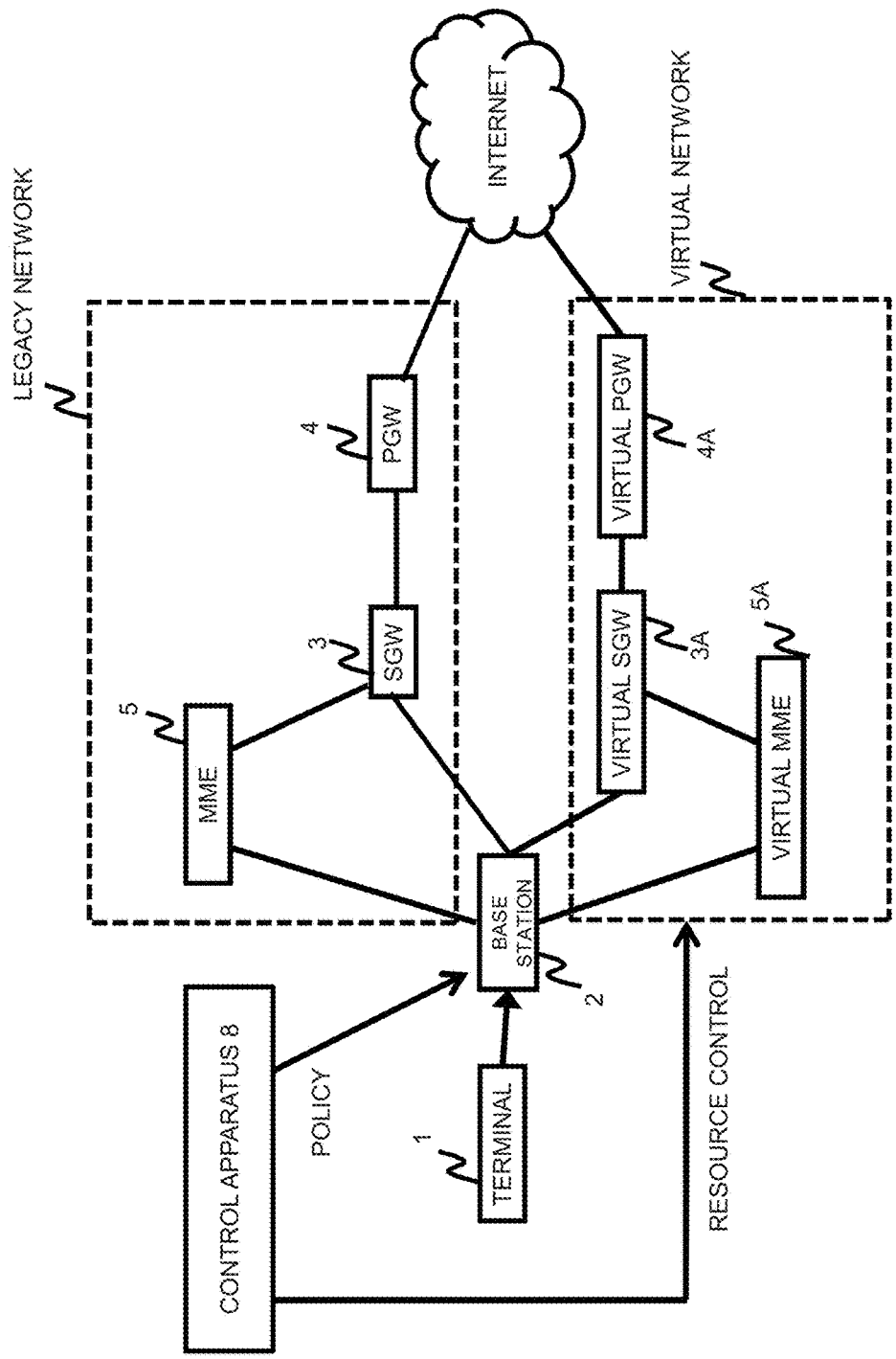
FIG. 23 is a system architecture diagram showing an example of a communication system according to a sixth exemplary embodiment of the present invention.

A communication system according to the present exemplary embodiment illustrated in FIG. 23 includes a plurality of networks (here, a legacy network and a virtual network), a terminal 1, a base station 2, and a control apparatus 8. The architectures of the legacy network and virtual network are as described already, and therefore the same reference signs are given thereto and details thereof will be omitted.

The control apparatus 8 performs resource provisioning in the virtual network. For example, the control apparatus 8, in preparation for communication traffic offloading, can allocate resources (server resource, CPU resource, network resource, and the like) to a virtual network node (virtual MME, virtual SGW, virtual PGW, or the like). This resource allocation to a virtual network node can be performed, for example, to a virtual machine that runs the virtual network node.

As an example, the control apparatus 8 can estimate a time period of day when communication traffic increases and, prior to this time period, perform resource provisioning in the virtual network. Moreover, the control apparatus 8 can also dynamically perform resource provisioning in the virtual network, responding to an increase in communication traffic.

6.2) Control Apparatus

Figure 24:
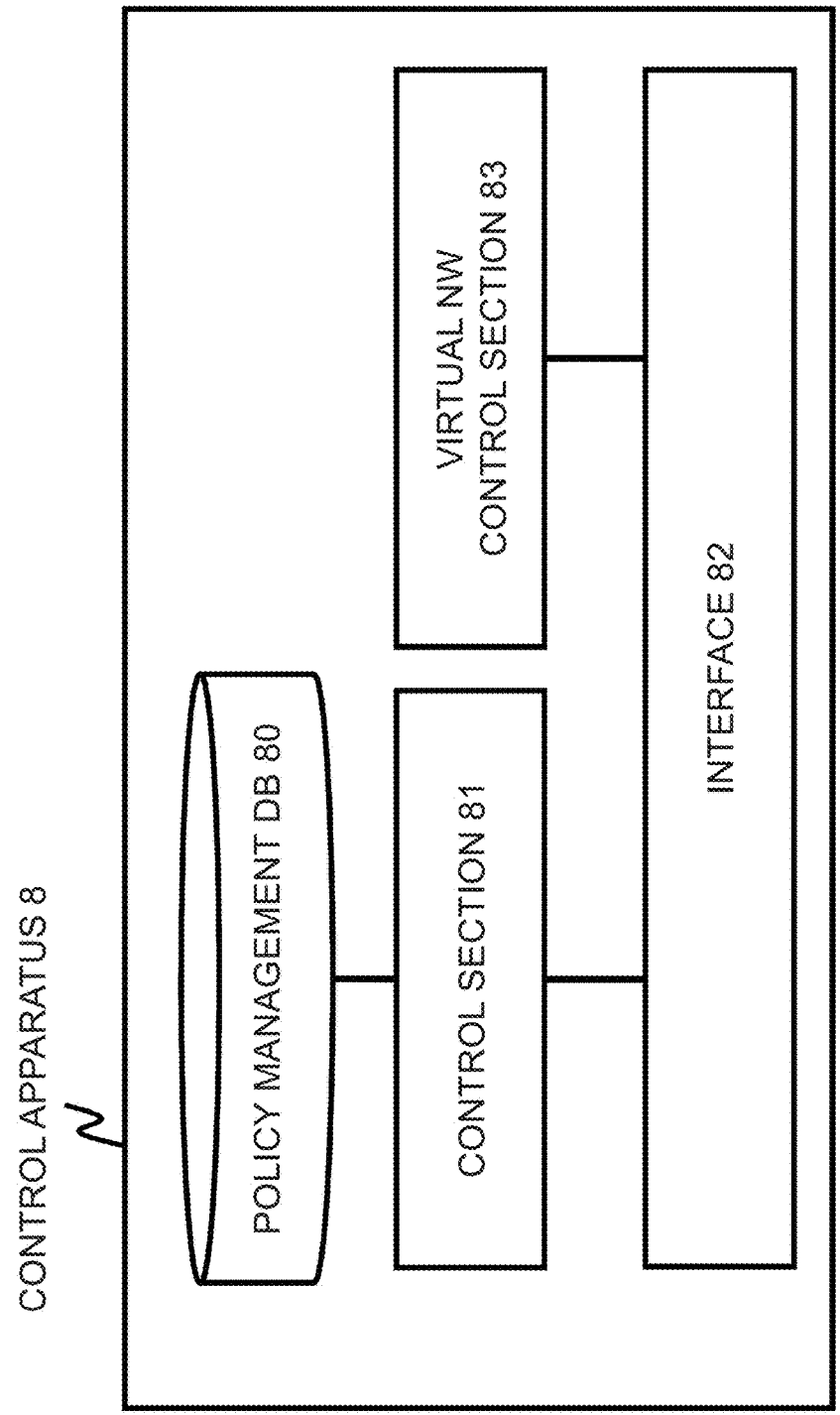
FIG. 24 is a block diagram showing an example of the schematic functional configuration of a control apparatus according to the sixth exemplary embodiment.

As illustrated in FIG. 24, the control apparatus 8 includes a virtual NW (network) control section 83 that performs resource provisioning in the virtual network, in addition to the configuration illustrated in the above-described fifth exemplary embodiment (see FIG. 21). However, the configuration of the control apparatus 8 according to the present exemplary embodiment is not limited to the example shown in FIG. 24. For example, the control apparatus 8 does not need to include a function of notifying a policy for network selection to the base station 2 and the like (policy management DB 80 or the like). Moreover, the control apparatus according to the present exemplary embodiment may be a discrete apparatus different from the control apparatus according to the fifth exemplary embodiment (FIG. 21).

Hereinafter, functional sections similar to those shown in FIG. 21 are denoted by the same reference signs as in FIG. 21, omitting a description thereof, and a detailed description will be given of the virtual NW control section 83 that performs resource provisioning in the virtual network.

The virtual NW control section 83, for example, prior to a time period of day when communication from an MTC device of a predetermined type occurs, allocates resources capable of processing the communication traffic from this MTC device to the virtual network.

For example, the virtual NW control section 83 allocates a resource for processing a control signal (e.g., control signal related to a network connection request) sent by the MTC device to the virtual MME 5A. Moreover, for example, the virtual NW control section 83 allocates resources for processing U-Plane (user-plane) data sent by the MTC device to the virtual SGW 3A and virtual PGW 4A. The virtual NW control section 83 may allocate a resource for processing communication traffic related to a group of MTC devices of a predetermined type to the virtual network. The virtual NW control section 83 may release the resources from the virtual network during a time period of day when communication traffic from the MTC device does not occur. The control section 81 of the control apparatus 8 notifies a policy for network selection to the base station 2 and the like, for example, in response to allocation of the resources for processing communication traffic related to the MTC device. The policy notified to the base station 2 and the like is, for example, an MTC device-related policy of the policies illustrated in the above-described fifth exemplary embodiment.

The virtual NW control section 83 can estimate a time period of day when communication traffic increases, for example, based on a result of analysis of communication traffic in the communication system and, based on the estimation result, allocate resources for processing the increasing communication traffic to the virtual network. The virtual NW control section 83 may perform the analysis of communication traffic. Moreover, the virtual NW control section 83 may acquire the result of traffic analysis from the network operator via OSS/BSS (Operation Support System/Business Support System).

For example, the virtual NW control section 83 allocates a resource for processing control signals of the communication traffic expected to increase to the virtual MME 5A. Moreover, for example, the virtual NW control section 83 allocates resources for processing U-Plane (user-plane) data expected to increase to the virtual SGW 3A and virtual PGW 4A.

The control section 81 of the control apparatus 8 notifies a policy for network selection to the base station 2 and the like, for example, in response to allocation of the resources. Moreover, the control section 81 can also notify at least one of the policies illustrated in the above-described fifth exemplary embodiment to the base station 2 and the like. For example, to offload communication traffic, the control section 81 notifies the base station 2 and the like of a policy indicating to forward communication traffic related to a predetermined application to the virtual network.

The virtual NW control section 83 can allocate resources to the virtual network, for example, in response to occurrence of a disaster such as an earthquake. Moreover, the virtual NW control section 83 can allocate resources to the virtual network, for example, prior to a date and time when an event attracting many terminal users takes place.

For example, the virtual NW control section 83 can allocate resources for processing telephone calls or data communication expected to increase with occurrence of a disaster or an event, to the virtual SGW 3A, virtual PGW 4A, and virtual MME 5A. The control section 81 of the control apparatus 8 notifies a policy for network selection to the base station 2 and the like, for example, in response to allocation of the resources. For example, the control section 81 can also notify at least one of the policies illustrated in the above-described fifth exemplary embodiment to the base station 2 and the like. For example, to offload communication traffic, the control section 81 may notify the base station 2 and the like of a policy indicating to forward communication traffic related to a predetermined application to the virtual network. Alternatively, the control section 81 can also notify the base station 2 and the like of a policy indicating to connect terminals 1 corresponding to a predetermined user attribute (e.g., general user) to the virtual network. Moreover, for example, the control section 81 may notify the base station 2 and the like of a policy indicating to forward communication traffic related to telephone calls to either the virtual network or the legacy network in a round-robin manner for each user.

The virtual NW control section 83 can allocate resources to the virtual network, for example, based on a performance required of the virtual network. For example, the virtual NW control section 83 allocates resources to the virtual network so that SLA (Service Level Agreement) required of the virtual network will be satisfied. The control section 81 of the control apparatus 8 notifies a policy for network selection to the base station 2 and the like, for example, in response to allocation of the resources. For example, the control section 81 may notify at least one of the policies illustrated in the above-described fifth exemplary embodiment to the base station 2 and the like.

For example, the virtual NW control section 83 can estimate the amount of communication traffic expected to flow into the virtual network in accordance with a policy that has been notified to the base station 2 and the like. The virtual NW control section 83 may estimate the amount of communication traffic expected to flow into the virtual network in accordance with a policy that is to be notified to the base station 2 and the like. The virtual NW control section 83 allocates resources to the virtual network, based on the thus estimated communication amount. For example, the virtual NW control section 83 allocates to the virtual network resources required to process the communication traffic expected to flow into the virtual network. The virtual NW control section 83 may allocate to the virtual network resources required to process the communication traffic expected to flow into the virtual network with a performance satisfying a predetermined SLA. The control section 81 of the control apparatus 8 notifies a policy for network selection to the base station 2 and the like, for example, in response to allocation of the resources. For example, the control section 81 notifies at least one of the policies illustrated in the above-described fifth exemplary embodiment to the base station 2 and the like.

6.3) Communication Apparatus

Figure 25:
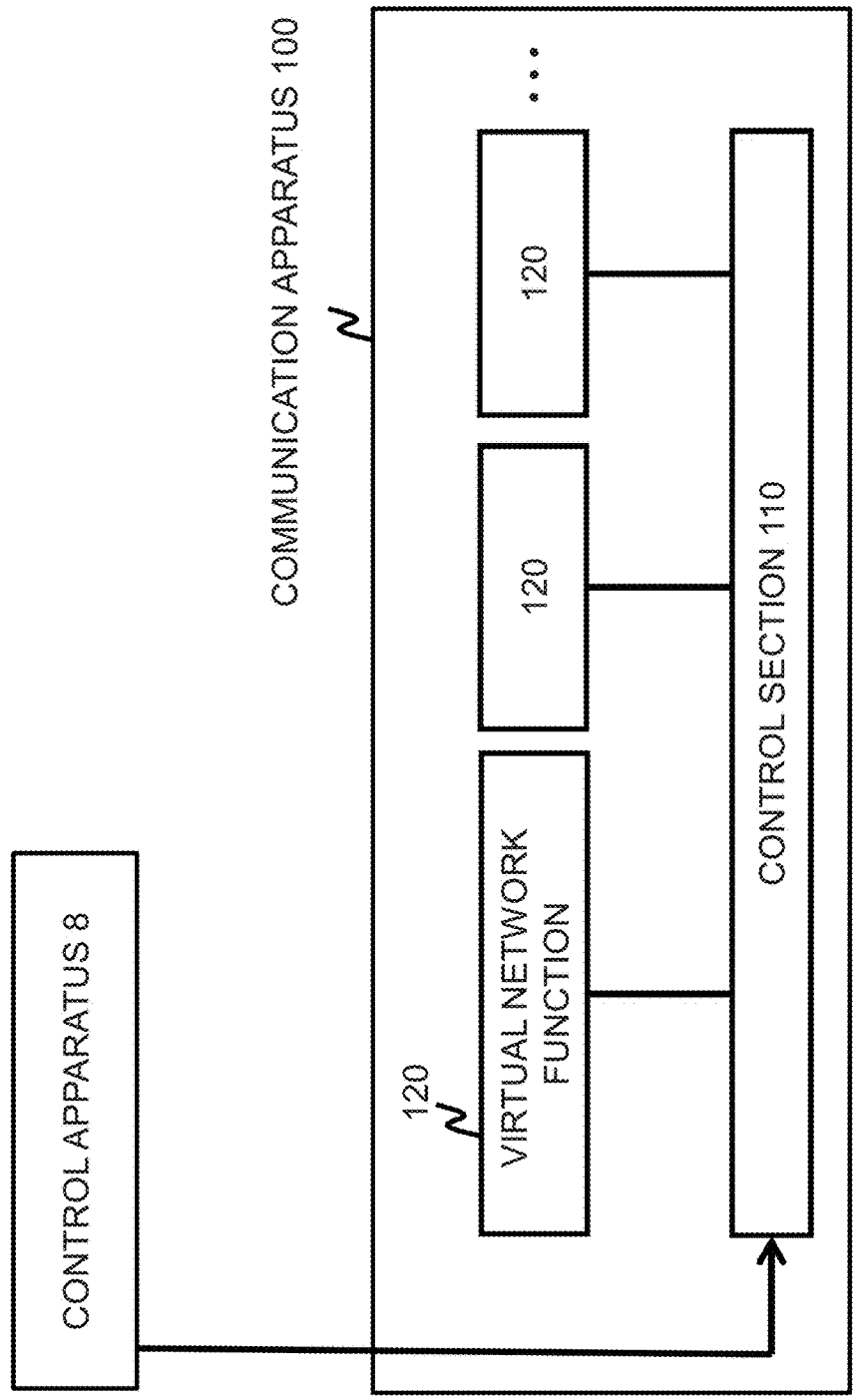
FIG. 25 is a block diagram showing an example of the schematic functional configuration of a communication apparatus according to the sixth exemplary embodiment.

As illustrated in FIG. 25, a communication apparatus 100 is an apparatus running virtual machines that provide virtual network functions in the virtual network, that is, the functions of virtual network nodes (e.g., virtual SGW 3A, virtual PGW 4A, virtual MME 5A, and the like), and is, for example, a server, router, or the like.

It is assumed that the communication apparatus 100 includes a control section 110 and at least one virtual network function (VNF: Virtual Network Function) 120.

The control section 110 can operate a VNF 120, which provides the functions of a virtual network node, on a virtual machine. For example, the control section 110 may be configured by using control software capable of computer virtualization, such as Hypervisor.

The control section 110 can perform at least one of activation, deactivation, and migration (migration of a virtual machine to another communication apparatus 100) of a virtual machine to run/running a VNF 120.

Each of the virtual network nodes has, for example, the following functions. Virtual P-GW 4A:

Function of processing packets (User-Plane function)
Function of managing charging status based on communication (PCEF: Policy and Charging Enforcement Function)
Function of controlling policies such as QoS (PCRF: Policy and Charging Rule Function)

Virtual S-GW 3A:

Function of processing packets (User-Plane function)
Function of processing control signaling (C-Plane function)
Lawful interception (LI: Lawful Interception) function for intercepting communication Virtual MME 5A:

Function of processing control signaling (C-Plane function)
Function of managing subscriber information in the communication system in liaison with HSS (Home Subscriber Server)

The VNFs 120 operate as the above-mentioned virtual network nodes on virtual machines. In the above-described exemplary embodiment, a VNF 120 is constructed for each virtual network node, but a VNF 120 may be constructed for each function included in each virtual network node. For example, a VNF 120 may operate as the U-Plane function of the virtual PGW 4A on a virtual machine.

The virtual NW control section 83 of the control apparatus 8 can instruct the control section 110 of the communication apparatus 100 about at least one of activation, deletion, and migration of a virtual machine for executing a VNF 120. The virtual NW control section 83 can control a resource in the virtual network by instructing the control section 110 about at least one of activation, deletion, and migration of a virtual machine.

7. Seventh Exemplary Embodiment

According to a seventh exemplary embodiment of the present invention, the operator of a virtual network can rent out the virtual network to the operator of a legacy network. The operator of the virtual network can gain a charge for use of the virtual network by renting the virtual network in return for payment. Moreover, the operator of the legacy network can virtually reinforce the network even if the operator itself makes no capital investment on the legacy network. The seventh exemplary embodiment is applicable to any of the first to sixth exemplary embodiments.

7.1) System Architecture

Figure 26:
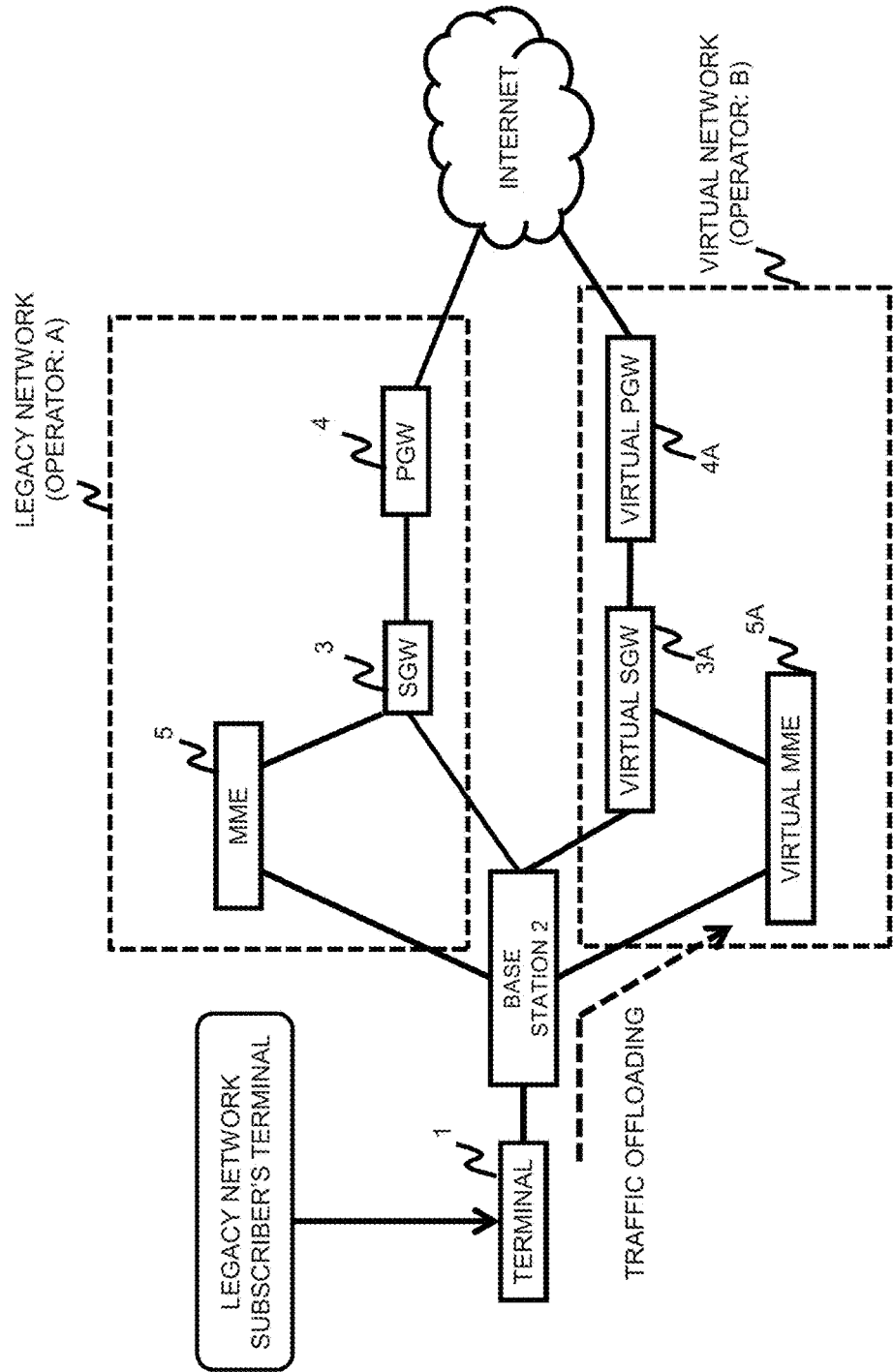
FIG. 26 is a system architecture diagram showing an example of a communication system according to a seventh exemplary embodiment of the present invention.

A communication system according to the present exemplary embodiment illustrated in FIG. 26 includes a plurality of networks (here, a legacy network and a virtual network) operated by their respective operators, a terminal 1, and a base station 2, wherein it is assumed that the terminal 1 is a terminal of a subscriber to the legacy network. The architectures of the legacy network and virtual network are as described already, and therefore the same reference signs are given thereto and details thereof will be omitted.

Referring to FIG. 26, the operator of the virtual network (operator: B) can rent out the virtual network to the operator of the legacy network (operator: A). The operator A can reduce the load on the legacy network by offloading communication traffic onto the rented virtual network.

The base station 2 is assumed to be owned by the operator A or B, and can send at least part of communication traffic from the terminals of the operator A's subscribers to the virtual network. The base station 2 can identify a communication traffic of a subscriber's terminal and can send the identified traffic to the virtual network. The base station 2 can send part of communication traffic from the terminals of the operator A's subscribers to the virtual network, for example, based on the policies illustrated in the above-described fifth exemplary embodiment.

Figure 27:
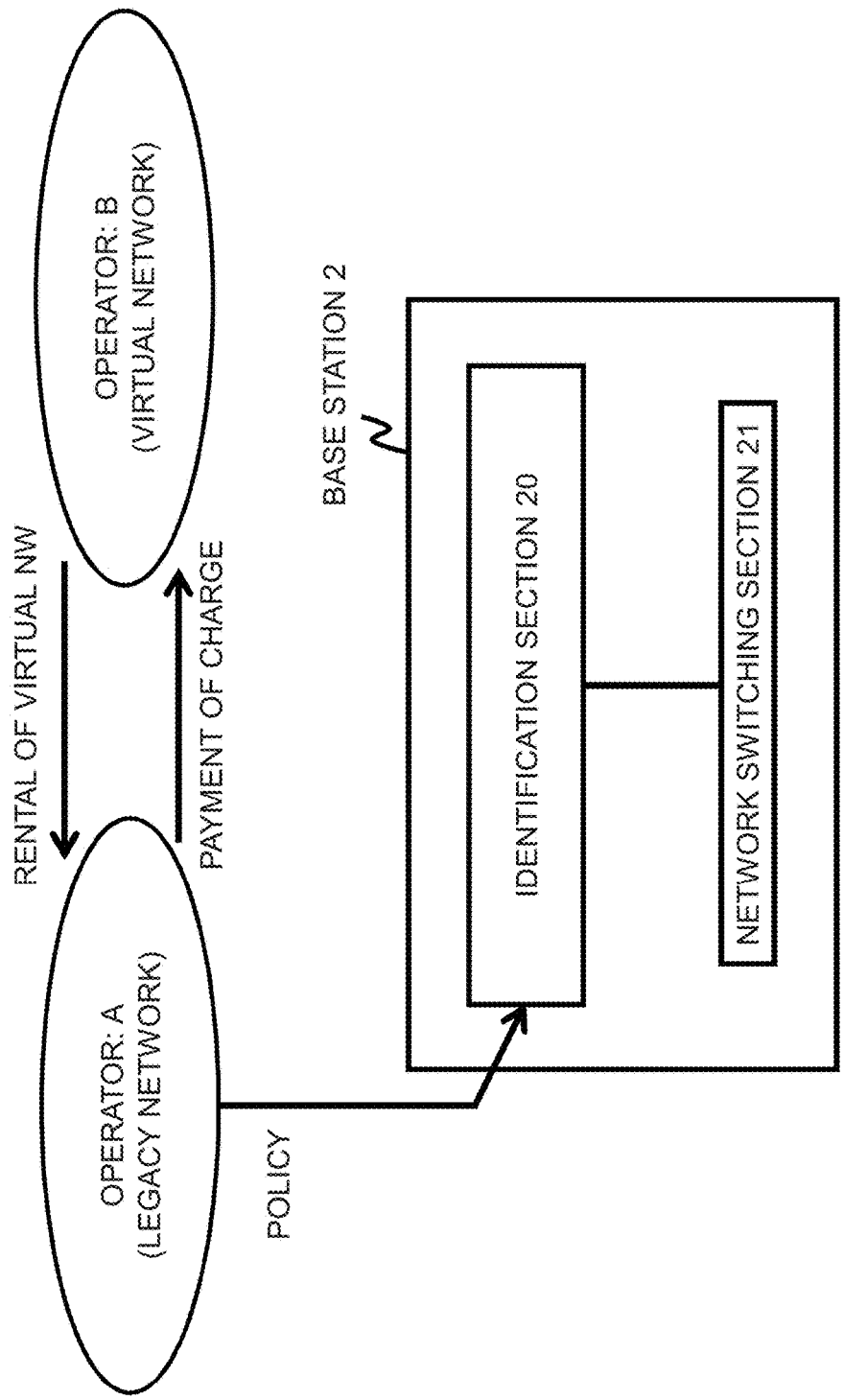
FIG. 27 is a schematic system architecture diagram for describing an example of a charging method in the communication system according to the seventy exemplary embodiment.

As illustrated in FIG. 27, the operator A pays a usage charge to the operator B in return for use of the virtual network owned by the operator B. For a method for charging the operator A, for example, a monthly or annual flat-rate system, a meter-rate system depending on communication data or a communication duration in the virtual network, a meter-rate system depending on resource amounts corresponding to virtual machines allocated to the virtual network for the operator A, or the like can be employed. Note that these charging methods are recited for illustration, and a method for charging the operator A is not limited to the above-mentioned examples.

Policies for network selection to be set on the base station 2 by the operator A may be, for example, the policies illustrated in the above-described fifth exemplary embodiment. Moreover, the operator A may set a policy on the MME 5. The base station 2 or MME 5 selects a network for the terminal 1 to connect to, in accordance with the set policy. Note that it is also possible that the operator B of the virtual network sets policies on the base station 2 or the like on behalf of the operator A.

7.2) First Operation Example

Figure 28:
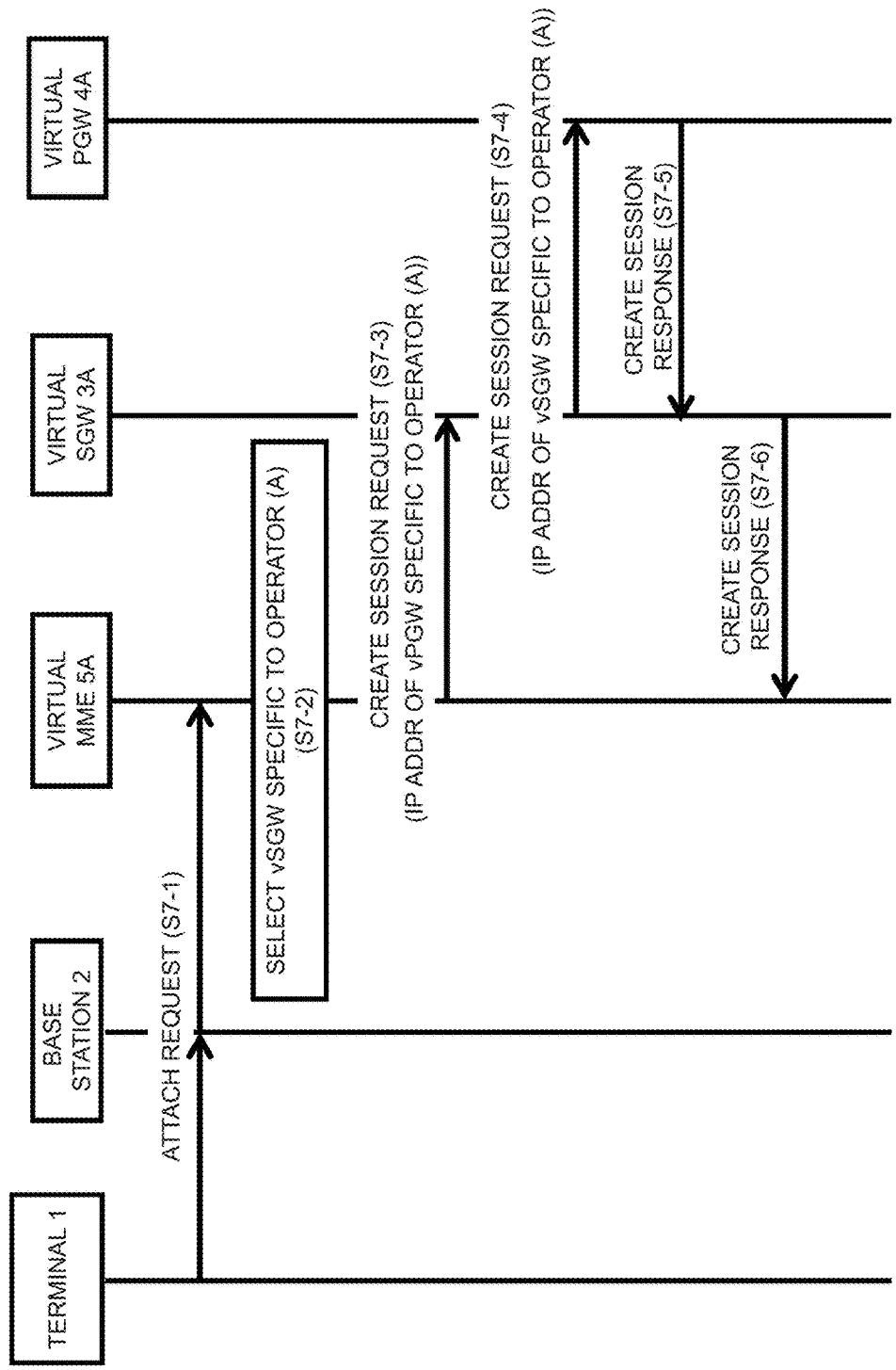
FIG. 28 is a sequence chart showing an example of operation in the communication system according to the seventh exemplary embodiment.

As illustrated in FIG. 28, the base station 2 sends "Attach Request" received from the terminal 1 to the virtual MME 5A (Operation S7-1). Prior to Operation S7-1, the base station 2 can select the virtual MME 5A as the transmission destination of this "Attach Request" through Operations S2-5 and S2-6 in FIG. 6. Moreover, the virtual MME 5A may be selected as the transmission destination of the "Attach Request" through Operations S3-6 to S3-9 in FIG. 8. Further, the virtual MME 5A may be selected as the transmission destination of the "Attach Request" through Operations S4-5 to S4-7 in FIG. 11. Furthermore, the "Attach Request" may be sent to the virtual MME 5A based on the operations illustrated in FIG. 16, 18, or 19.

The base station 2 can manage a virtual MME 5A for each operator that uses the virtual network. For example, the network switching section 21 of the base station 2 can select a dedicated virtual MME 5A for the operator A. That is, the base station 2 can select the dedicated virtual MME 5A for a traffic from the terminal 1 of a subscriber to the legacy network owned by the operator A.

Prior to reception of the "Attach Request", the virtual MME 5A performs processing for authenticating the terminal 1. The virtual MME 5A can authenticate the terminal 1, for example, by using an HSS 6 deployed in the virtual network. The virtual MME 5A may authenticate the terminal 1 by using an HSS 6 deployed in the legacy network.

For example, the HSS 6 manages the IMSI of the terminal 1 in association with information related to the operator to which the terminal 1 subscribes. For example, in the above-mentioned authentication processing, the virtual MME 5A acquires the information related to the operator to which the terminal 1 subscribes from the HSS 6 and identifies the operator corresponding to the terminal 1.

The virtual MME 5A initiates EPS bearer establishment. In the example of FIG. 28, the virtual MME 5A allocates dedicated gateways (virtual SGW 3A and virtual PGW 4A) to the operator A that rents the virtual network from the operator B. Even if another operator (e.g., operation C) rents the virtual network from the operator B, different gateways are allocated to the operators A and C, respectively. A different gateway is allocated to each operator that uses the virtual network, whereby communication traffics related to the individual operators are virtually separated, and security is enhanced.

The virtual MME 5A, in response to reception of the "Attach Request", selects the virtual SGW 3 specific to the operator A (Operation S7-2).

For example, referring to the configuration of the MME shown in FIG. 10, the virtual entity management section 50 of the virtual MME 5A manages virtual entities (virtual SGW 3A, virtual PGW 4A, and the like) for each operator that uses the virtual network. The control section 51 of the virtual MME 5A selects the virtual SGW 3A corresponding to the operator A in accordance with the virtual entity management section 50.

Moreover, for example, the control section 51 of the virtual MME 5A selects a virtual SGW 3A to be allocated to the operator A from among the virtual entities managed by the virtual entity management section 50. The virtual entity management section 50 associates the virtual SGW 3A selected by the control section 50 with the identification information of the operator to which this virtual SGW 3A is allocated. The control section 51, when selecting a virtual SGW 3A, selects a virtual entity with which no identification information of an operator is associated, among the virtual entities managed by the virtual entity management section 50.

The virtual MME 5A sends a "Create Session Request" message to the virtual SGW 3A selected in Operation S7-2 (Operation S7-3). The virtual MME 5A allocates the dedicated virtual PGW 4A to the operator A that rents the virtual network from the operator B. The virtual MME 5A sets the IP address of the virtual PGW 4A allocated to the operator A in the "Create Session Request" message.

For example, the virtual entity management section 50 of the virtual MME 5A manages virtual entities (virtual SGW 3A, virtual PGW 4A, and the like) for each operator using the virtual network. The control section 51 of the virtual MME 5A sets the IP address of the virtual PGW 4A corresponding to the operator A in the "Create Session Request" message in accordance with the virtual entity management section 50.

Moreover, for example, the control section 51 of the virtual MME 5A selects a virtual PGW 4A to be allocated to the operator A from among the virtual entities managed by the virtual entity management section 50. The virtual entity management section 50 associates the virtual PGW 4A selected by the control section 51 with the identification information of the operator to which this virtual PGW 4A is allocated. The control section 51, when selecting a virtual PGW 4A, selects a virtual entity with which no identification information of an operator is associated, among the virtual entities managed by the virtual entity management section 50.

The virtual SGW 3A, in response to reception of the "Create Session Request" message from the virtual MME 5A, sends a "Create Session Request" message to the virtual PGW 4A designated in the received message (Operation S7-4). The virtual SGW 3A sets its own IP address in the message to send to the virtual PGW 4A.

The virtual PGW 4A sends a "Create Session Response" message to the virtual SGW 3A (Operation S7-5).

The virtual SGW 3A sends a "Create Session Response" message to the virtual MME 5A (Operation S7-6). In response to reception of the "Create Session Response" message, the virtual MME 5A notifies the base station 2 of information for establishing a session between the virtual SGW 3A and the base station 2.

Through the operations illustrated in FIG. 28 above, an EPS bearer is established in the virtual network. The terminal (terminal 1 in FIG. 28) of the subscriber to the legacy network of the operator A performs communication via the established EPS bearer.

7.3) Second Operation Example

Figure 29:
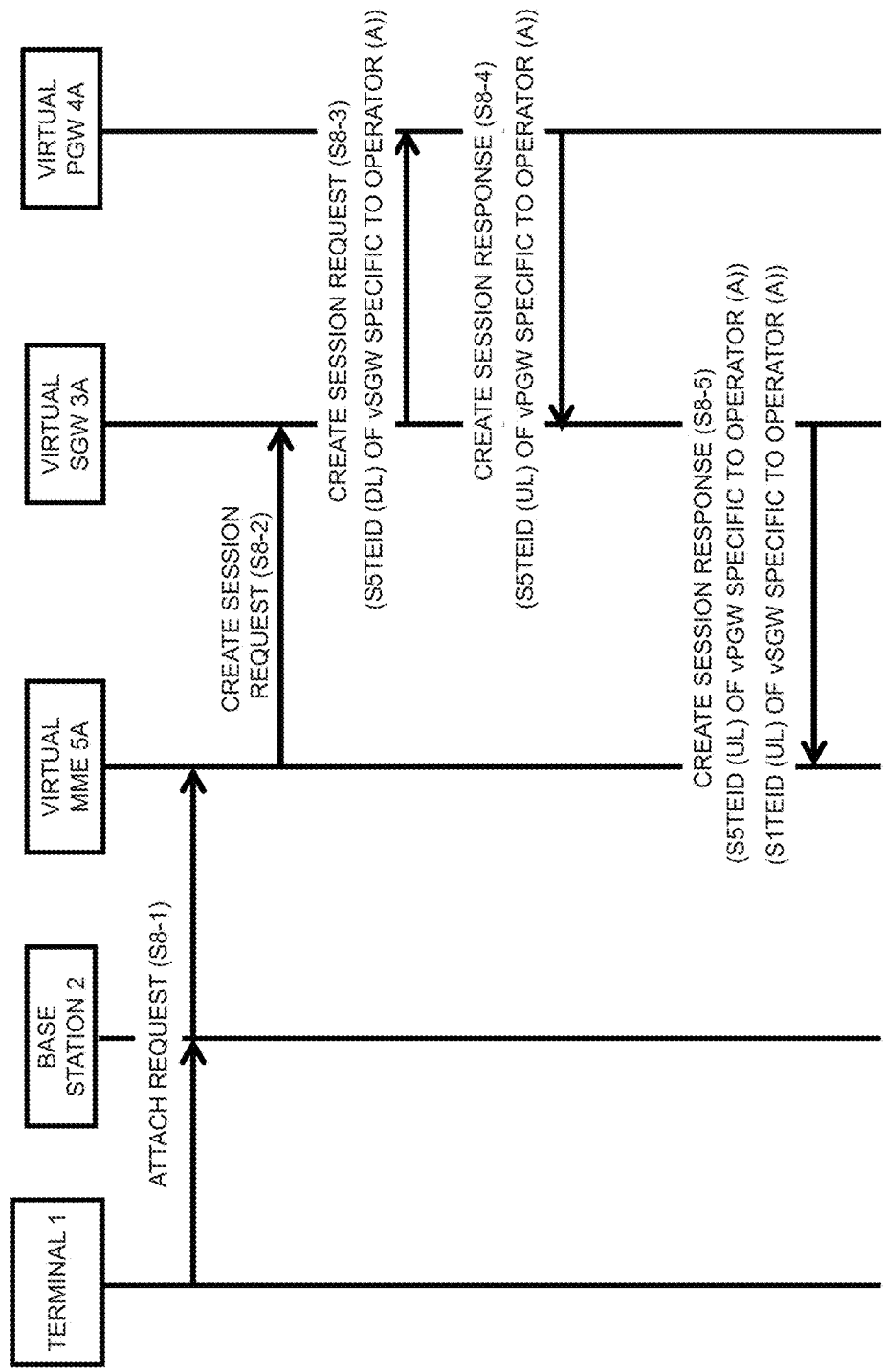
FIG. 29 is a sequence chart showing another example of operation in the communication system according to the seventh exemplary embodiment.

As illustrated in FIG. 29, the base station 2 sends "Attach Request" received from the terminal 1 to the virtual MME 5A (Operation S8-1). For example, prior to Operation S8-1, the base station 2 selects the virtual MME 5A as the transmission destination of the "Attach Request" through Operations S2-5 and S2-6 in FIG. 6. Moreover, for example, the base station 2 may select the virtual MME 5A as the transmission destination of the "Attach Request" through Operations S3-6 to S3-9 in FIG. 8. Further, for example, the base station 2 may select the virtual MME 5A as the transmission destination of the "Attach Request" through Operations S4-5 to S4-7 in FIG. 11. Furthermore, for example, the base station 2 may send the "Attach Request" to the virtual MME 5A based on the operations illustrated in FIGS. 16, 18, and 19.

Prior to reception of the "Attach Request", the virtual MME 5A performs processing for authenticating the terminal 1. The virtual MME 5A can authenticate the terminal 1, for example, by using the HSS 6 deployed in the virtual network. The virtual MME 5A may authenticate the terminal 1 by using the HSS 6 deployed in the legacy network.

For example, the HSS 6 manages the IMSI of the terminal 1 in association with information related to the operator to which this terminal 1 subscribes. For example, in the above-mentioned authentication processing, the virtual MME 5A acquires the information related to the operator to which the terminal 1 subscribes from the HSS 6 and identifies the operator corresponding to the terminal 1.

The virtual MME 5A, when receiving the "Attach Request", sends a "Create Session Request" message to the virtual SGW 3A (Operation S8-2). For example, the virtual MME 5A sets the information related to the operator corresponding to the terminal 1 in the "Create Session Request". The virtual MME 5A initiates EPS bearer establishment by sending the "Create Session Request" message.

In the example of FIG. 29, each of the virtual MME 5A, virtual SGW 3A, and virtual PGW 4A allocates a dedicated TEID to a bearer related to the operator A that rents the virtual network from the operator B. Even if another operator (e.g., operator C) rents the virtual network from the operator B, a TEID specific to each operator is allocated to each of the bearers related to the operators A and C, respectively. A TEID specific to each operator that uses the virtual network is allocated, whereby security is enhanced.

The virtual SGW 3A, when receiving the "Attach Request" from the virtual MME 5A, sends a "Create Session Request" message to the virtual PGW 4A (Operation S8-3). The virtual SGW 3A allocates a TEID for the operator A to the terminal 1, which is a terminal of the operator A's subscriber, and sets the selected TEID in the "Create Session Request" message. Moreover, the virtual SGW 3A may set the information related to the operator corresponding to the terminal 1 in the "Create Session Request".

The virtual SGW 3A can manage, for each operator that uses the virtual network, a group of candidate TEIDs to allocate to the operator. For example, the virtual SGW 3A manages a group of candidate TEIDs to allocate to the operator A and a group of candidate TEIDs to allocate to the operator C. The virtual SGW 3A selects a TEID, based on operator information notified from the virtual MME 5A.

Moreover, for example, the virtual SGW 3 selects a TEID to allocate to the operator A from a TEID group. The virtual SGW 3A associates the selected TEID with the identification information of the operator to which this TEID is allocated. When selecting a TEID, the virtual SGW 3A selects a TEID with which no identification information of an operator is associated.

The virtual PGW 4A, when receiving the "Create Session Request" message from the virtual SGW 3A, returns a "Create Session Response" message to the virtual SGW 3A (Operation S8-4). The virtual PGW 4A allocates a TEID for the operator A to the terminal 1, which is a terminal of the Operator A's subscriber, and sets the selected TED in the "Create Session Response" message. The virtual PGW 4A selects the TED, for example, by a method similar to that used by the virtual SGW 3A.

The virtual SGW 3A, when receiving the "Create Session Request" message from the virtual PGW 4A, sends a "Create Session Response" message to the virtual MME 5A (Operation S8-5). The virtual SGW 3A allocates a TEID for the operator A to the terminal 1, which is a terminal of the operator A's subscriber, and sets the selected TEID in the "Create Session Response" message. The virtual MME 5A, in response to reception of the "Create Session Response" message, notifies the base station 2 of information for establishing a session between the virtual SGW 3A and the base station 2.

Through the operations illustrated in FIG. 29 above, an EPS bearer is established in the virtual network. The terminal (terminal 1 in FIG. 29) of the subscriber to the legacy network of the operator A performs communication via the established EPS bearer.

7.4) Other System Architecture

Figure 30:
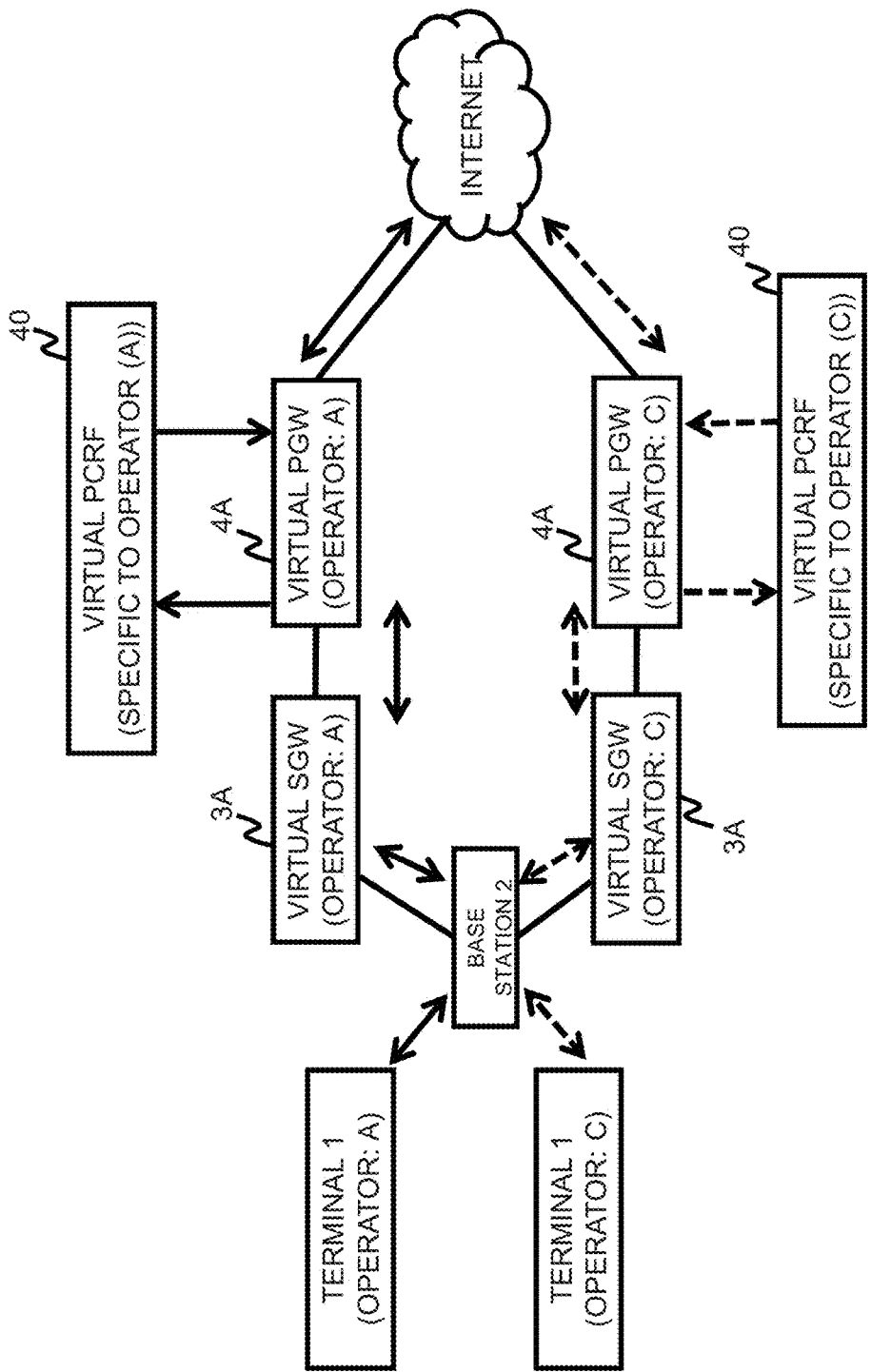
FIG. 30 is a system architecture diagram showing another example of the communication system according to the seventh exemplary embodiment.

In a communication system illustrated in FIG. 30, the virtual network operator (operator B) can monitor communication traffic related to an operator that rents the virtual network from the operator B.

More specifically, a virtual PCRF (Policy and Charging Rule Function) 40 deployed in the virtual network monitors communication traffic. A virtual PCRF 40 is deployed for each operator (operator A, operator C) that rents the virtual network from the operator B.

For example, the operator B of the virtual network deploys the virtual PCRFs 40 in the virtual network through the control apparatus 8. For example, referring to the configuration shown in FIG. 24, the virtual NW control section 83 of the control apparatus 8 deploys, in the virtual network, a virtual PCRF 40 for monitoring communication traffic related to the operator A that uses the virtual network.

For example, each virtual PGW 4A connects to a virtual PCRF 40 for an operator that is associated with the virtual PGW 4A. Each virtual PGW 4A can count the number of packets by using PCEF (Policy and Charging Enforcement Function) function and forward the result of counting the number of packets to the virtual PCRF 40 connected to the virtual PGW 4A.

The virtual network operator (operator B) monitors the number of counted packets at each virtual PCRF 40 and acquires a communication amount for each operator that uses the virtual network. The operator B charges each operator for use of the virtual network, for example, based on the communication amount of the operator.

Exemplary embodiments of the present invention have been described hereinabove. However, the present invention is not limited to each of the above-described embodiments. The present invention can be implemented based on a modification of, a substitution of, and/or an adjustment to each exemplary embodiment. Moreover, the present invention can be also implemented by combining any of the exemplary embodiments. That is, the present invention incorporates the entire disclosure of this description, and any types of modifications and adjustments thereof that can be implemented based on technical ideas. Furthermore, the present invention can be also applied to the technical field of SDN (Software-Defined Network).

REFERENCE SIGNS LIST

1 Terminal
10 Message generation section
11 Communication section
2 Base station
20 Identification section
21 Network switching section
22 Switch section
23 Port
24 Policy management DB
3 SGW
3A Virtual SGW
4 PGW
4A Virtual PGW
40 Virtual PCRF
5 MME
50 Virtual entity management section
51 Control section
5A Virtual MME
7 Router
70 Switch section
71 Port
72 Policy management DB
8 Control apparatus
80 Policy management DB
81 Control section
82 Interface
83 Virtual NW control section
100 Communication apparatus
110 Control section
120 Virtual network function

The invention claimed is:

1. A communication apparatus that is a base station connected to a first network and a second network, the first network and the second network being core networks, the communication apparatus comprising:

a first controller that is configured to select, from among a plurality of network nodes including a first network node and a second network node, the second network node for a terminal capable of autonomous communication with a communication-counterpart equipment when the communication apparatus that is the base station receives a network connection request from the terminal, wherein the first network node performs predetermined signal processing in the first network and the second network node operates a function of the first network node through a virtual machine in the second network; and a second controller that is configured to send communication data related to the terminal to the second network node selected, wherein the second controller is configured to send the communication data related to processing for connection between at least one of the plurality of networks and the terminal, to the second network node selected, wherein the first controller is configured to select the second network node for the terminal, wherein the second network node is operated by the virtual machine which is dynamically constructed, and wherein the first controller is configured to select the second network node for the terminal, wherein the second network node is operated by the virtual machine, which is dynamically constructed according to a requirement related to processing of the communication data of the terminal.

2. The communication apparatus according to claim 1, wherein the first controller is configured to select the second network node for the terminal, wherein the second network node is operated by the virtual machine, which is dynamically constructed according to an occurrence timing of the communication data of the terminal.

3. The communication apparatus according to claim 1, wherein the first controller is configured to select the second network node for the terminal, based on information included in a connection request sent from the terminal.

4. The communication apparatus according to claim 1, wherein the first controller is configured to select the second network node for a terminal belonging to a predetermined group among terminals capable of autonomous communication with the communication-counterpart equipment.

5. A communication method, in a communication apparatus that is a base station connected with a first network and a second network, the first network and the second network being core networks, the communication method comprising:

selecting, from among a plurality of network nodes including a first network node and a second network node, the second network node for a terminal capable of autonomous communication with a communication-counterpart equipment, by the communication apparatus that is the base station when receiving a network connection request from the terminal, wherein the first network node performs predetermined signal processing in the first network and the second network node operates a function of the first network node through a virtual machine in the second network; and sending, by the communication apparatus, communication data related to the terminal to the second network node selected, wherein the communication data related to processing for connection between at least one of the plurality of networks and the terminal, is sent to the second network node selected, wherein the second network node is selected for the terminal, wherein the second network node is operated by the virtual machine which is dynamically constructed, and wherein the second network node is selected for the terminal, wherein the second network node is operated by the virtual machine, which is dynamically constructed according to a requirement related to processing of the communication data of the terminal.

6. The communication method according to claim 5, wherein the second network node is selected for the terminal, wherein the second network node is operated by the virtual machine, which is dynamically constructed according to an occurrence timing of the communication data of the terminal.

7. The communication method according to claim 5, wherein the second network node is selected for the terminal, based on information included in a connection request sent from the terminal.

8. The communication method according to claim 5, wherein the second network node is selected for a terminal belonging to a predetermined group among terminals capable of autonomous communication with the communication-counterpart equipment.

9. A non-transitory recording medium storing a computer program which comprises a set of instructions to execute the communication method according to claim 5.

10. A communication system comprising:
a plurality of network nodes including a first network node and a second network node, wherein the first network node performs predetermined signal processing in a first network and the second network node operates a function of the first network node through a virtual machine in a second network, wherein the first network and the second network are core networks; and
a communication apparatus that is a base station and that processes communication data related to a terminal, wherein the communication apparatus includes:
a first controller that is configured to select, from among the plurality of networks nodes, the second network node for a terminal capable of autonomous communication with a communication-counterpart equipment; and
a second controller that is configured to send communication data related to the terminal to the second network node selected,
wherein the communication data related to processing for connection between at least one of the plurality of networks and the terminal, is sent to the second network node selected,
wherein the second network node is selected for the terminal, wherein the second network node is operated by the virtual machine which is dynamically constructed, and
wherein the second network node is selected for the terminal, wherein the second network node is operated by the virtual machine, which is dynamically constructed according to a requirement related to processing of the communication data of the terminal.

11. The communication system according to claim 10, wherein the second network node is selected for the terminal, wherein the second network node is operated by the virtual machine, which is dynamically constructed according to an occurrence timing of the communication data of the terminal.

* * * * *